（12）United States Patent
Adamson et al.

(10) Patent No.: US 10,521,289 B2
(45) Date of Patent: Dec. 31, 2019

(54) IDENTIFICATION OF PERFORMANCE AFFECTING FLAWS IN A COMPUTING SYSTEM

(71) Applicant: Hewlett Packard Enterprise Development LP, Houston, TX (US)

(72) Inventors: David Adamson, San Mateo, CA (US); Roderick Bagg, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/798,991

(22) Filed: Oct. 31, 2017

(65) Prior Publication Data
US 2019/0129779 A1　May 2, 2019

(51) Int. Cl.
G06F 11/07　(2006.01)
G06F 11/34　(2006.01)

(52) U.S. Cl.
CPC ........ G06F 11/0793 (2013.01); G06F 11/079 (2013.01); G06F 11/3447 (2013.01); G06F 11/3466 (2013.01)

(58) Field of Classification Search
CPC . G06F 11/079; G06F 11/0793; G06F 11/1476
USPC ................................... 714/26, 47.1
See application file for complete search history.

(56) References Cited

U.S. PATENT DOCUMENTS

| | | | |
|---|---|---|---|
| 7,565,262 B2 | 7/2009 | Yuan et al. | |
| 7,856,575 B2 * | 12/2010 | Bock ................... | G06F 11/0748 714/26 |
| 8,868,985 B2 * | 10/2014 | Hackstein ............ | G05B 23/024 714/48 |
| 9,465,548 B1 | 10/2016 | Hrischuk et al. | |
| 10,102,055 B1 * | 10/2018 | Gaber ................... | G06F 11/079 |
| 10,198,339 B2 * | 2/2019 | Salunke .................. | G06F 11/34 |
| 2008/0262822 A1 | 10/2008 | Hardwick et al. | |
| 2014/0351642 A1 * | 11/2014 | Bates .................. | G06F 11/0709 714/26 |

(Continued)

FOREIGN PATENT DOCUMENTS

WO　2016/077089 A1　5/2016

OTHER PUBLICATIONS

JustinSteventon et al., "'Fix me' button doesn't work when trying to get Insider builds (error 80310052)," 2015, (web page), <https://answers.microsoft.com/en-us/windows/forum/windows_10/fix-me-button-doesnt-work-when-trying-to-get/4cbe6867-6c66-4870-b7e8-99a595c7b5ca>, 9 pages.

(Continued)

*Primary Examiner* — Joseph R Kudirka
(74) *Attorney, Agent, or Firm* — Hewlett Packard Enterprise Patent Department

(57) ABSTRACT

A flaw classifier model classifies a computing system as one which contains or does not contain one or more flaws that affect a performance of the computing system. Inputs to the flaw classifier model may include an actual utilization of a resource of the computing system and an expected utilization of the resource of the computing system. The expected utilization of the resource may be determined by an expected resource utilization model. Inputs to the expected resource utilization model may include workload description parameter values and hardware description parameter values.

19 Claims, 20 Drawing Sheets

(56) References Cited

U.S. PATENT DOCUMENTS

2015/0254162 A1 9/2015 Baril et al.
2016/0217022 A1* 7/2016 Velipasaoglu ........ G06F 11/079

OTHER PUBLICATIONS

Cornell University, "Skype for Business (Windows) Problem: Server is Temporarily Unavailable," Oct. 18, 2017, <https://it.cornell.edu/skype-win/skype-business-windows-problem-server-temporarily-unavailable>, 2 pages.

Microsoft, "Troubleshooting Resource Governor," May 28, 2014, (web page), <https://web.archive.org/web/20140528163658/http://technet.microsoft.com/en-us/library/cc627395 (v=sql.105).aspx>.

Digital Equipment Corporation, "DSNlink File Copy," DSNlink for VMS User's Guide, Oct. 30, 1990, Chapter 4, <http://odl.sysworks.biz/disk$cddoc03jul11/decw$book/d7wtaaa2.tContents.decw$book>.

Digital Equipment Corporation, "DSNlink Interactive Text Search," DSNlink for VMS User's Guide, Oct. 30, 1990, Chapter 2, <http://odl.sysworks.biz/disk$cddoc03jul11/decw$book/d7wtaaa2.tContents.decw$book>.

Digital Equipment Corporation, "Introduction to DSNlink for VMS," DSNlink for VMS User's Guide, Oct. 30, 1990, Chapter 1, <http://odl.sysworks.biz/disk$cddoc03jul11/decw$book/d7wtaaa2.tContents.decw$book>.

Hewlett Packard Enterprise Development LP, "HPE Remote Device Access," Apr. 2017, Whitepaper.

Antunes; et al., "Using Behavioral Profiles to Detect Software Flaws in Network Servers", Software Reliability Engineering (ISSRE), 2011 IEEE 22nd International Symposium on Nov. 29-Dec. 2011, INSPEC Access No. 12490633, 10 pages.

"Software Testing terms complete glossary", Software Testing Help, retrieved Oct. 27, 2017 from: http://www.softwaretestinghelp.com/software-testing-terms-complete-glossary/, 20 pages.

Digital Equipment Corporation, "Acquiring ECOs from Digital," DSNlink Version 2.2 help file, 1998.

* cited by examiner

Systems and Customers who would benefit from a hardware upgrade:

1. Computing System A, Enterprise A (saturated resource: CPU)

Fig. 2D

Systems that should be investigated for possible performance affecting flaw:

1. Computing System B, Enterprise B (saturated resource: CPU)
2. Computing System C, Enterprise C (saturated resource: none)

Fig. 2E

| Scenario | Characterization | Recommendation |
|---|---|---|
| (a) Resource Utilization chart: Actual and Expected overlapping in saturated range | Contains Flaw = False<br>Resource Sat. = True | 1. Apply IOPS limits<br>2. Stagger workload<br>3. Upgrade hardware |
| (b) Resource Utilization chart: Actual in saturated range, Expected below | Contains Flaw = True<br>Resource Sat. = True | 1. Apply IOPS limits<br>2. Stagger workload<br>3. Contact customer support |
| (c) Resource Utilization chart: Expected and Actual both below saturated range | Contains Flaw = False<br>Resource Sat. = False | none |
| (d) Resource Utilization chart: Actual above Expected, both below saturated range | Contains Flaw = True<br>Resource Sat. = False | 1. Flag for internal investigation (no customer-facing action) |

Legend
▒ Range of resource utilization characterized as being resource saturated

Fig. 9

IDENTIFICATION OF PERFORMANCE AFFECTING FLAWS IN A COMPUTING SYSTEM

BACKGROUND

Numerous techniques have been employed to detect the presence of flaws in a computing system. Some of these techniques include detecting specific flaw signatures, for example in log messages, back-traces and core dumps. While such techniques may properly detect the presence of flaws, often flaws go unnoticed. A computing system may operate with poor performance and the operator of the computing system may be left wondering whether the poor performance is due to a readily fixable flaw that manifests itself under his/her specific circumstances, whether the poor performance is due to the saturation of a hardware resource (e.g., CPU, drive bandwidth, etc.) due to genuine high system usage or whether the poor performance is due to some combination of the former and latter causes.

BRIEF DESCRIPTION OF THE DRAWINGS

FIG. 2D depicts a user interface for reporting any computing systems and/or enterprises operating the computing systems which would benefit from a hardware upgrade, according to one embodiment.

FIG. 2E depicts a user interface for reporting any computing systems which should be investigated for possible performance affecting flaws, according to one embodiment.

FIG. 9 depicts a table illustrating various resource utilization scenarios (e.g., excess resource utilization with and without resource saturation, normal resource utilization with and without resource saturation), according to one embodiment.

DETAILED DESCRIPTION

Figure 1:
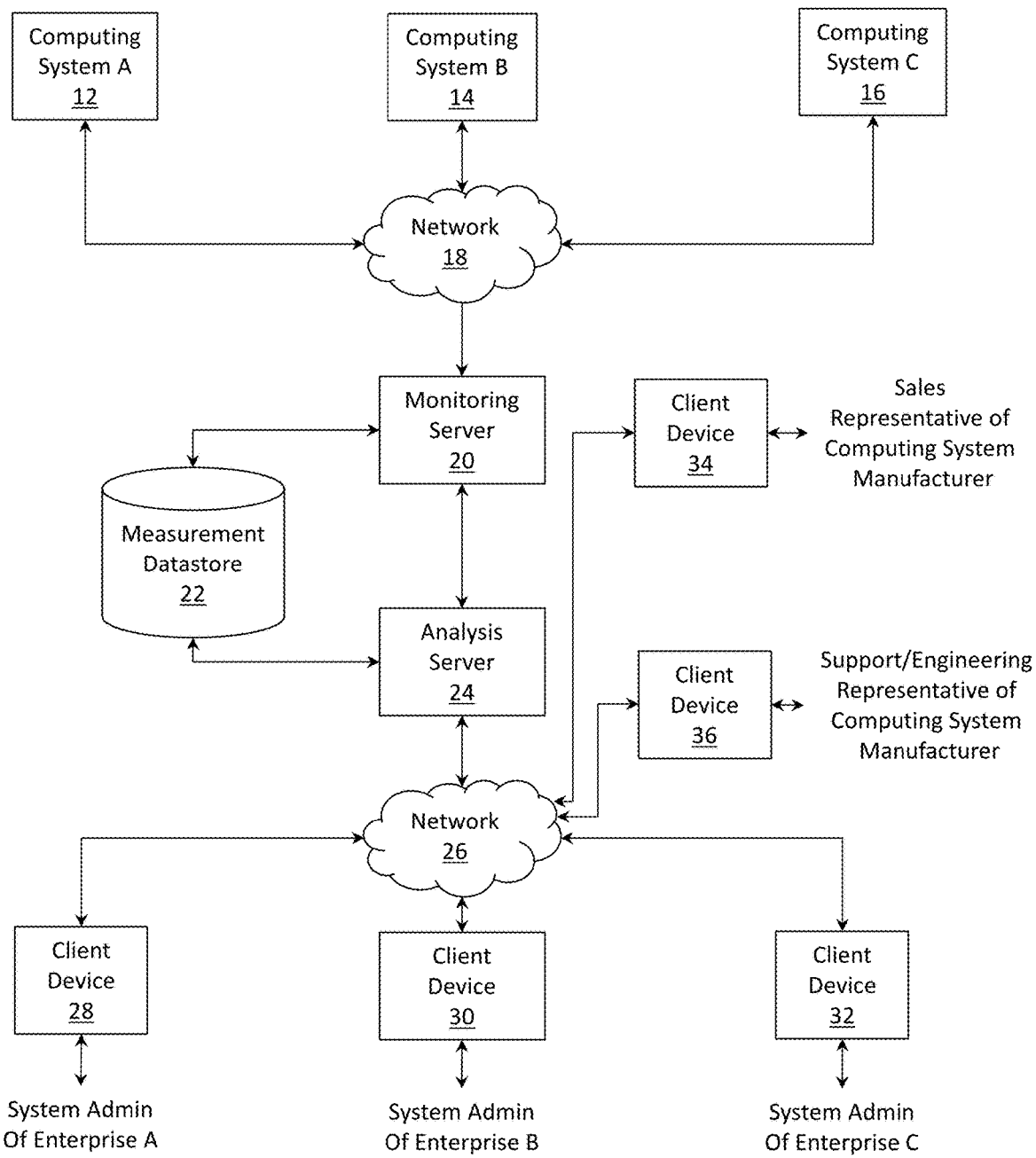
FIG. 1 depicts a system diagram in which a plurality of computing systems transmit sensor measurements to a monitoring/analysis server, which stores and analyzes the sensor measurements, according to one embodiment.

In the following detailed description of embodiments described herein, reference is made to the accompanying drawings that form a part hereof, and in which are shown by way of illustration of embodiments. It is understood that other embodiments may be utilized and structural changes may be made. Description associated with any one of the figures may be applied to a different figure containing like or similar components/steps. While the sequence diagrams each present a series of steps in a certain order, the order of some of the steps may be changed.

The embodiments described herein relate to methods and systems for identifying occurrences of performance affecting flaws in a computing system, and more particularly relates to performing such determination using a flaw classification model cascaded with an expected resource utilization model. These flaws can be hardware or software in nature and can be due to oversights in either the computing system's design or implementation and are often colloquially referred to as bugs.

Described herein are techniques to discover flaw signatures for computing systems with varying hardware configurations, and detect the presence of flaws in the computing systems based on the discovered flaw signatures. The discovery of flaw signatures takes place during the training of a flaw classifier model (or more generally, one or more flaw classifier models) and the detection of flaws takes place during the application of the flaw classifier model. Inputs to the flaw classifier model may include an actual resource utilization percentage, an expected resource utilization percentage, and possibly other inputs. The actual resource utilization percentage being much higher than the expected resource utilization percentage is one factor that could indicate the presence of a flaw. In one embodiment, a requirement for the detection of a flaw by the flaw classifier model is that the flaw manifests itself comparatively rarely so that the flaw can be detected as a significant enough outlier from the computing system's normal operation.

The expected resource utilization percentage may be determined by an expected resource utilization model, and hence the flaw classifier model may be cascaded with the expected resource utilization model. Inputs to the expected resource utilization model may include workload description parameters (e.g., input/output operations per second (IOPS), bandwidth or throughput measured in megabytes per second (MBPS), number of reads, number of writes, whether encryption is enabled or disabled, whether deduplication is enabled or disabled, snapshot and replication schedules, whether an offloaded data transfer (ODX) mechanism like XCOPY is being employed, etc.) and hardware description parameters (e.g., CPU core count and type, hard disk drive (HDD) count and type, solid state drive (SSD) count and type, random access memory (RAM) amount and type, a series of a computing system, etc.). The expected resource utilization model may be trained across various hardware configurations, and may be trained using regression techniques.

The flaw classifier model being cascaded with the expected resource utilization model causes the training of the models to be carried out in a certain manner. First the expected resource utilization model is trained over various workloads and hardware configurations. Such training of the expected resource utilization model enables the expected resource utilization model to predict the expected resource utilization over a wide range of workloads and hardware configurations. Upon the expected resource utilization model being sufficiently trained, the trained expected resource utilization model is cascaded with an untrained flaw classifier model. The flaw classifier model is then trained over various input, some of which is human classified as characteristic of a computing system that is experiencing a flaw (and more generally, one or more flaws) and some of which is human classified as characteristic of a computing system that is not experiencing a flaw (and more generally, not experiencing one or more flaws). The training data for the flaw classifier model could be from a single computer system, computer systems with similar hardware configurations or computer systems with different hardware configurations. As a consequence of the expected resource utilization model being trained across various hardware configurations, the flaw classifier model may be applicable across various hardware configurations, even if the flaw classifier model is not trained across various hardware configurations.

A computing system may be classified into one out of four regimes, depending on whether a flaw is suspected (i.e., whether the flaw classification model indicates a flaw to be present or not) and whether the computing system is resource saturated. Resource saturation occurs when the actual resource utilization has reached or exceeded a level over which a degradation in the performance (e.g., measured in terms of the read latency, the write latency or both) of the computing system is present. Each of the four regimes may be handled in a certain manner. If the computing system is classified as not experiencing a performance affecting flaw and being resource saturated, a system administrator of the computer system may receive the recommendation to stagger the workload and/or upgrade the hardware. If the computing system is classified as experiencing a performance affecting flaw and being resource saturated, the system administrator of the computer system may receive the recommendation to stagger the workload, contact customer support and/or apply a fix to the flaw if such a fix is known. If the computing system is classified as not experiencing a flaw and not being resource saturated, no recommendation may be provided (as no remediation measures may be needed). Lastly, if the computing system is classified as experiencing a flaw and not being resource saturated, the computing system may be flagged for internal investigation (i.e., investigation by a support/engineering representative of a computing system manufacturer) with no customer-facing action (i.e., no remediation measures for the system administrator).

In accordance with one embodiment, data used to train one or more of the expected resource utilization model and the flaw classifier model may be restricted to time durations for which the computing system experiences resource saturation. Similarly, when the expected resource utilization model and the flaw classifier model are applied, they may be restricted to time durations with resource saturation. This is particularly beneficial as it can remove some of the noise and complexity from the dataset, providing the machine learning models with a more targeted, less open-ended problem to manage. In general, the simpler the pattern that a model needs to recognize, the easier it is to implement the model to solve the classification problem effectively.

FIG. 1 depicts an environment 10 within which embodiments described herein may be instantiated. In environment 10, a number of computing systems (12, 14, 16) may be communicatively coupled with monitoring server 20 via network 18. A computing system may include a combination of components, including a combination of physical components, such as compute, networking and storage components (separate or integrated), operating together with software such as hypervisors, container managers, operating systems, and other elements in order to support computer programs and applications. A computing system can in many instances be one of multiple interoperating computing systems which support multiple applications.

Computing system A (labeled as element 12) may be operated by enterprise A; computing system B (labeled as element 14) may be operated by enterprise B; and computing system C (labeled as element 16) may be operated by enterprise C. It should be understood that FIG. 1 has been depicted in a simplified fashion. In a more general context, one or more computing systems may be operated by each of the enterprises, and a single computing system may be operated a plurality of enterprises (e.g., the resources of the computing system being shared by a plurality of virtual machines which are each operated by an enterprise). Network 18 may comprise any form of electronic communications link(s) and, in some cases, may be individual communications links, or one or more communications networks (e.g., computer networks), including private networks, public networks and/or virtual private networks over public networks.

Each of the computing systems may be instrumented with a number of sensors that measure one or more workload description parameters, resource utilization and additional measurements associated with components and/or processes of the computing system. The workload description parameters may include input/output operations per second (IOPS), bandwidth or throughput measured in megabytes per second (MBPS), number of reads, number of writes, whether encryption is enabled or disabled, whether deduplication is enabled or disabled, snapshot and replication schedules, etc. Resource utilization may include a percentage of utilization of a central processing unit (CPU), a percentage of utilization of solid state drive (SSD) bandwidth, percentage of utilization of hard disk drive (HDD) bandwidth, etc. Additional measurements may include how a resource of the computing system is being used (e.g., the proportion of CPU usage by specific sub-modules of the operating system), machine state variables, activity of a background task, etc.

Measurements may be taken on a periodic basis (e.g., every second, every minute, every 5 minutes, etc.) or recorded for every operation and reported periodically such that a time series of measurements may be generated by each sensor. In one embodiment, measurements may be transmitted in real-time from each of the computing systems to monitoring server 20, while in another embodiment, measurements may be stored locally at each computing system, before being periodically transmitted in batches from each computing system to monitoring server 20 (e.g., once every hour, once every day, etc.) so that measurements do not constantly flood network 18. A large quantity of measurements may be taken at each computing system. In one embodiment, approximately 30 million measurements are transmitted from each computing system to monitoring server 20 every day.

Upon receiving the sensor measurements, monitoring server 20 may store the measurements in measurement datastore 22, which is accessible to analysis server 24. Analysis server 24 may analyze the measurements associated with each of the computing systems in order to determine an expected utilization of a resource of a computing system, determine whether a computer system is operating with a performance affecting flaw (e.g., a software flaw or a hardware flaw), provide remediation measures to address poor performance of a computing system, determine any computing systems and/or enterprises operating the computing systems which would benefit from a hardware upgrade, etc. A flaw can be due to oversights in either the computing system's design or implementation and may cause the computing system to behave in unexpected ways (e.g., consume resources in excess of what is expected). Flaws of particular interest are those that negatively impact the performance of a computing system. While monitoring server 20 and analysis server 24 are depicted as separate components in the embodiment of FIG. 1, monitoring server 20 and analysis server 24 could, in another embodiment, be configured as a single component. Alternatively, monitoring server 20 and analysis server 24 may each be constructed as a network-connected cluster of servers.

The analysis generated by analysis server 24 may be reported to various client devices via network 26. Similar to network 18, network 26 may comprise any form of electronic communications link(s) and, in some cases, may be individual communications links, or one or more communications networks (e.g., computer networks), including private networks, public networks and/or virtual private networks over public networks. For example, recommendations to remediate poor performance of computing system A may be reported via client device 28 to a system administrator of enterprise A; recommendations to remediate poor performance of computing system B may be reported via client device 30 to a system administrator of enterprise B; and recommendations to remediate poor performance of computing system C may be reported via client device 32 to a system administrator of enterprise C (such reporting further described below in FIGS. 2A-2C). Further, sales representatives of a computing system manufacturer may be notified via client device 34 of any computing systems and/or enterprises operating the computing systems which would benefit from a hardware upgrade (such reporting further described below in FIG. 2D). Further, support and/or engineering representatives of a computer system manufacturer may be notified via client device 36 of any computing systems which should be investigated for possible performance affecting flaws (such reporting to support and/or engineering representatives further described below in FIG. 2E).

Figure 2A:
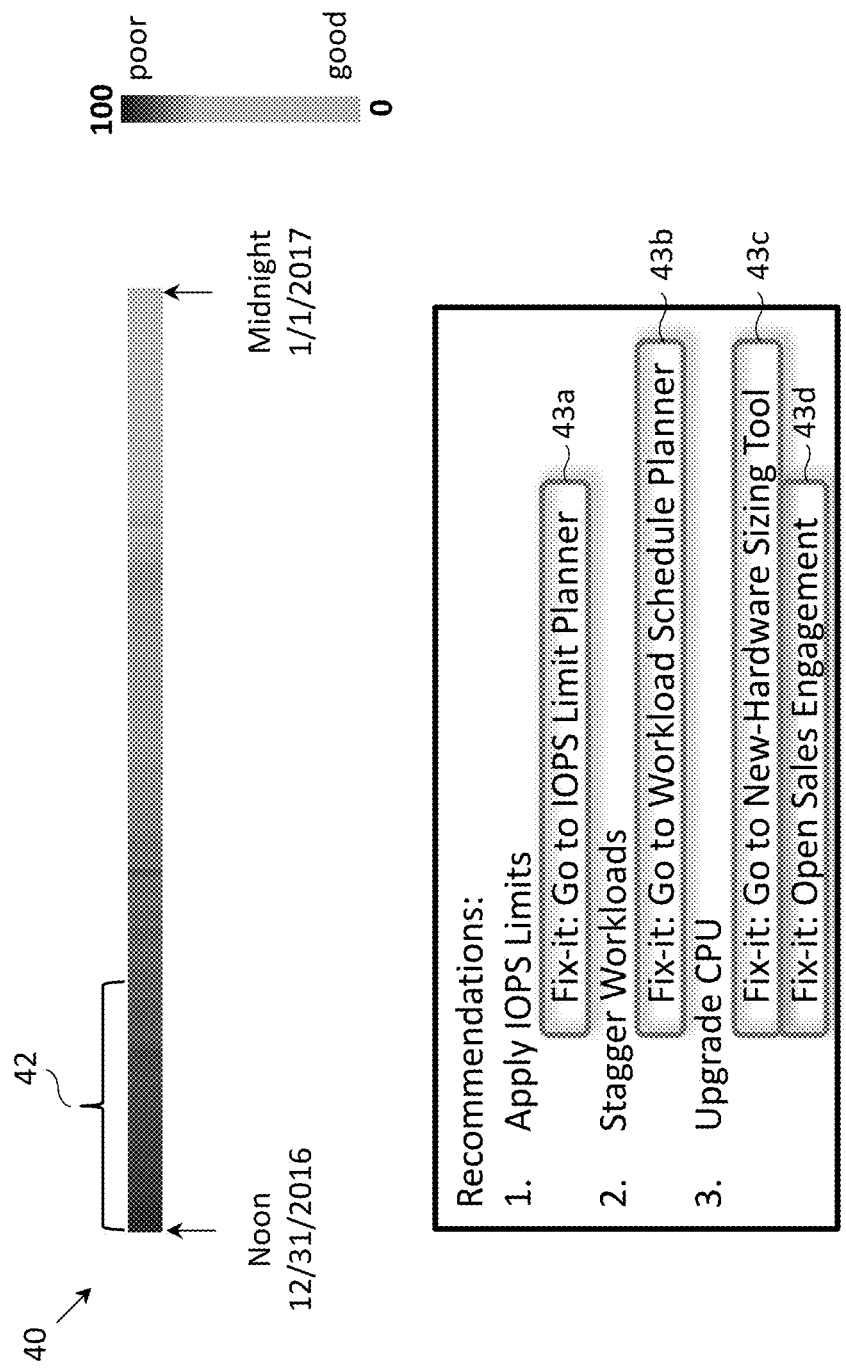
FIGS. 2A-2C depict example user interfaces for reporting the performance of a computing system and remediation measures (if any) for addressing poor performance of the computing system, according to one embodiment.
Figure 2B:
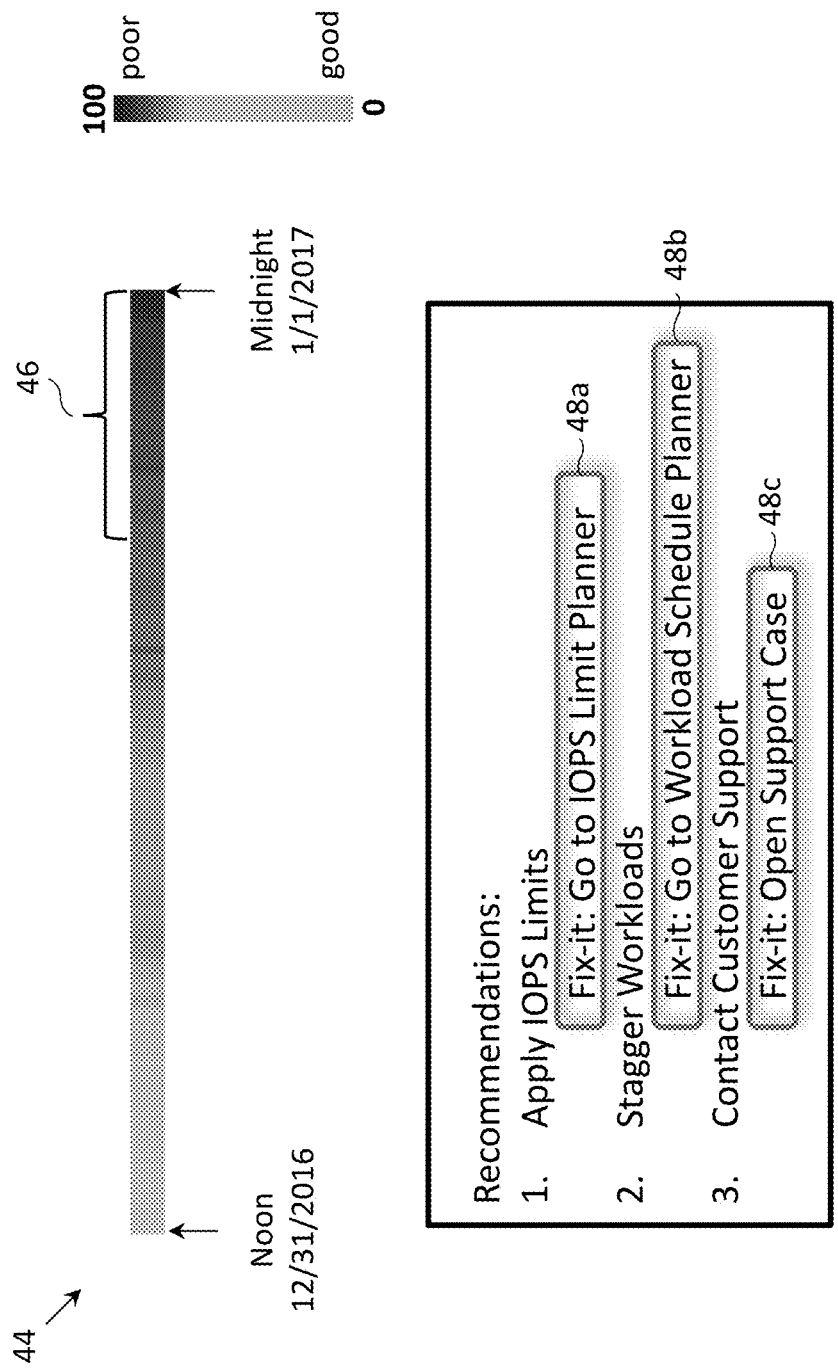
Figure 2C:
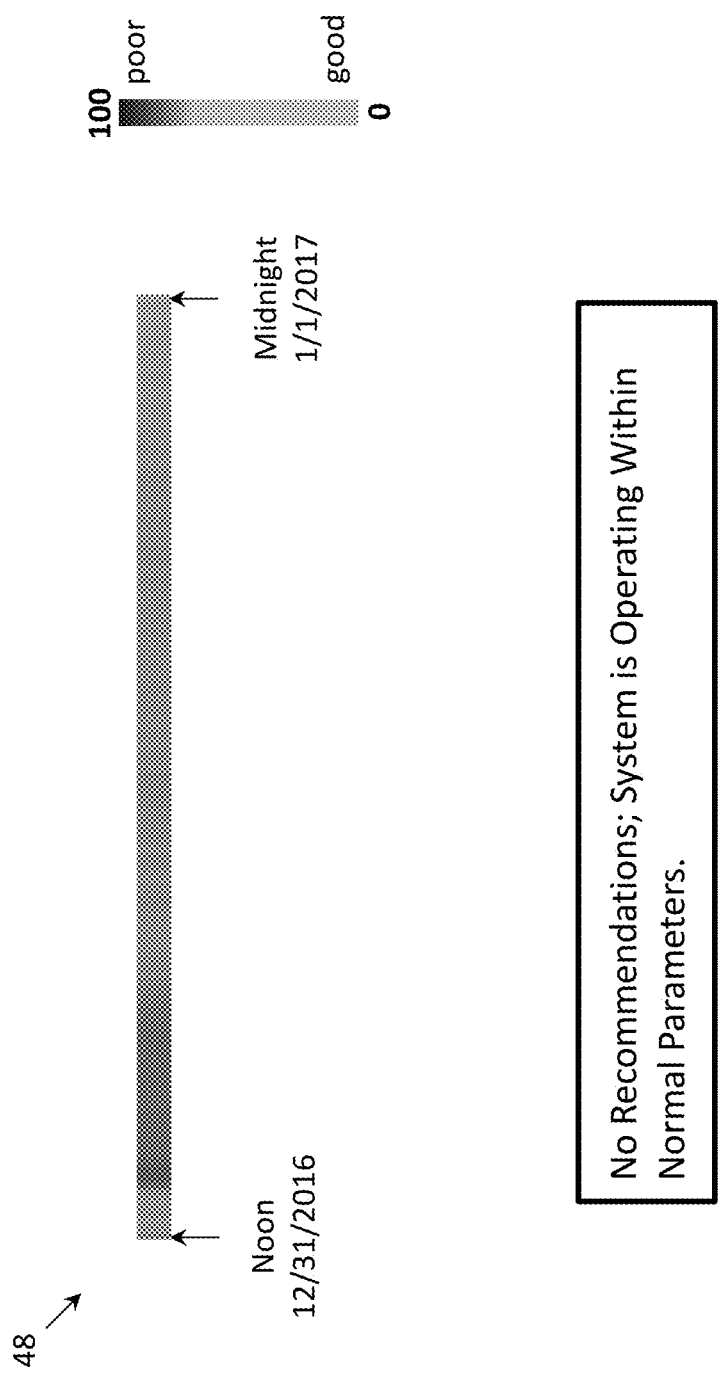

FIGS. 2A-2C depict example user interfaces for reporting the performance of a computing system and remediation measures (if any) for addressing the poor performance of the computing system, according to one embodiment. FIG. 2A depicts an example user interface that may be presented on client device 28 to the system administrator of enterprise A. The user interface may include heat bar 40 which displays the CPU saturation level over a period of time (darker color indicating more CPU saturation, lighter color indicating less CPU saturation). Time period indicator 42 may label a portion of heat bar 40 with particularly high CPU saturation. The scenario depicted in FIG. 2A may be determined by analysis server 24 to be indicative of computing system A (element 12) experiencing CPU saturation with no underlying performance affecting flaws, and as such, the recommended remediation measures may be for the system administrator of enterprise A to apply input/output operations per second (IOPS) limits to computing system A, stagger the workload of computing system A and/or upgrade the CPU of computing system A.

In addition to displaying remediation measures for addressing the poor performance of computing system A, the user interface may also include one or more user interface elements (e.g., selectable buttons) for the user (i.e., user of the user interface) to select the one or more remediation measures or perform activities associated with the one or more remediation measures. For example, selection of button 43a (i.e., "Fix-it: Go to IOPS Limit Planner") may result in the display of the predicted effects on the resource consumption of various components of computing system A when different IOPS limits are applied. As another example, selection of button 43b (i.e., "Fix-it: Go to Workload Schedule Planner") may result in the display of the predicted effects on the performance of computing system A when various workloads are staggered. As another example, selection of button 43c (i.e., "Fix-it: Go to New-Hardware Sizing Tool") may result in the display of the predicted effects on the performance of computing system A when computing system A is upgraded with new hardware. As another example, selection of button 43d (i.e., "Fix-it: Open Sales Engagement") may result in the opening of a sales engagement, the sales engagement facilitating the purchase of one or more CPUs.

FIG. 2B depicts an example user interface that may be presented on client device 30 to the system administrator of enterprise B. The user interface may include heat bar 44 which displays the CPU saturation level over a period of time. Time period indicator 46 may label a portion of heat bar 44 with particularly high CPU saturation. The scenario depicted in FIG. 2B may be determined by analysis server 24 to be indicative of computing system B experiencing a performance affecting flaw, and as such, the recommended remediation measures may be for the system administrator of enterprise B to apply IOPS limits, stagger the workload and/or contact customer support.

In addition to displaying remediation measures, one or more user interface elements (e.g., selectable buttons) may be provided for allowing the user to select the one or more remediation measures or perform activities associated with the one or more remediation measures. For example, selection of button 48a (i.e., "Fix-it: Go to IOPS Limit Planner") may result in the display of the predicted effects on the resource consumption of various components of computing system B when different IOPS limits are applied. As another example, selection of button 48b (i.e., "Fix-it: Go to Workload Schedule Planner") may result in the display of the predicted effects on the performance of computing system B when various workloads are staggered. As another example, selection of button 48c (i.e., "Fix-it: Open Support Case") may result in the opening of a support case for addressing the performance issues of computing system B.

FIG. 2C depicts an example user interface that may be presented on client device 32 to the system administrator of enterprise C. The user interface may include heat bar 48 which displays the CPU saturation over a period of time (darker color indicating more CPU saturation, lighter color indicating less CPU saturation). The scenario depicted in FIG. 2C may be determined by analysis server 24 to be indicative of computing system C experiencing a performance affecting flaw which causes only a moderate degree of CPU saturation. No remediation measures may be offered to the system administrator of enterprise C, and instead the computing system may be flagged for investigation by support/engineering representatives of the computing system manufacturer (as described in FIG. 2E below).

Remediation measures are now described in more detail. One remediation measure may include upgrading the software of the computing system or the software of a component (or product) the computing system interacts with (e.g., a separate storage appliance, networking appliance, compute appliance, or hypervisor). Another remediation measure may include upgrading the firmware of a subcomponent (e.g., a hard drive, solid state drive, a network interface card, etc.) of the computing system or another component (or product) that the computing system interacts with (e.g., a separate storage appliance, networking appliance, compute appliance, or hypervisor). Another remediation measure may include modifying the configuration of volumes, resource pools, virtual machines, datastores, vmdks, or other virtual objects within the computing system. These configuration changes could include, for example, enabling or disabling the caching of data or changing the caching policy on a specific volume or set of volumes (if volume performance is suffering due to a lack of access to the cache or competition for the cache), enabling or disabling deduplication on a specific volume or set of volumes (if the volume is not deduping well and the overhead of the deduplication process is deemed not worth the benefit), or changing IOPS or MBPS limits (imposing a limit on certain lower-priority volumes so other volumes can experience improved performance).

As another example, a remediation measure may include modifying system configurations, for example, the modification of operating system parameters that determine the relative priorities of background processes, the modification of operating system parameters that determine the parallelism of background processes, the modification of operating system parameters that determine the conditions under which certain background processes occur, and the modification of other internal operating system parameters that govern the behavior of the computing system.

As another example, a remediation measure may include moving the contents of a volume, virtual machine, or similar virtual objects from one computing system or resource pool (i.e., a logical abstraction for flexible management of resources) to another computing system or resource pool with more resources available. As another example, a remediation measure may include altering a data protection schedule to make it more or less aggressive with more or less data retention. As another example, a remediation measure (or an activity associated with a remediation measure) may include opening a support ticket to resolve a performance issue. As another example, a remediation measure (or an activity associated with a remediation measure) may include opening a sales engagement to purchase additional hardware.

As another example, a remediation measure (or an activity associated with a remediation measure) may include providing the user with a "what-if" or "planner" interface that allows the user to see the predicted effects of various remediation measures, allows the user to modify the remediation measures where necessary, and allows the user to subsequently press "fix-it" to enact the remediation measures. In the case of an IOPS limit planner (referenced above in FIGS. 2A and 2B), this planner could take the list of volumes (or virtual machines) and their current IOPS limits and predict the resource consumption of those objects and the latencies of input/output on those objects with different IOPS limits applied. The IOPS limit planner could also accept a list of relative priority scores for a set of volumes and provide the user with a starting point that they could then modify or not as desired. Upon finishing with the IOPS limit planner, the user could instruct the computing system to accept the proposed changes. The computing system would apply the changes and report back on how much deviation was observed from its predictions.

In the case of a workload schedule planner (referenced above in FIGS. 2A and 2B), this planner could take the volumes (or virtual machines) and using the time when they each are busy, attempt to offset the times at which those workloads run to minimize overlap and the use of specific compute resources. An "apply" button might not be available for this function, because it could be up to the person or persons running the applications themselves to stagger when those applications are being accessed and used (and not all scenarios would allow this to change—e.g. people logging on during daylight hours are not going to be convinced en-mass to log in at a different time), but for those volumes where the activity represents separately scheduled jobs, this workload schedule planner could provide some guidance as to what those schedules should be. Since some workloads may be inherently immobile, which workloads are allowed to be rescheduled could be received as an input from the user. The IOPS limit planner and workload schedule planner may be integrated into a single tool since the timing of workloads and the IOPS limits may affect one another.

To summarize, the recommendation logic of analysis server 24 may direct a system administrator down one of two principal paths: In the first case, when analysis server 24 determines that a performance affecting flaw is not likely to be present, the recommendation logic can notify the system administrator to either: (a) manage the workload (e.g. throttle or otherwise attenuate the workload's requirements—potentially by staggering co-incident activities to operate at different times) or (b) purchase more hardware. In the second case, when analysis server 24 determines that a performance affecting flaw is likely to be present, the recommendation logic can either: (a) if a remediation measure to fix the flaw is known, recommend applying that remediation measure (e.g., a software update) or (b) if a remediation measure is not known, indicate to the system administrator that he/she should not purchase additional hardware until he/she has first reached out to customer support to investigate his/her issue further. If the system administrator is interested in performance issues that are occurring for specific workloads during specific period(s) of time, the system administrator can adjust the scope of the recommendation by either selecting a specific time range or adjusting the sensitivity of the recommendation logic (e.g., the latency or latency severity score cutoff for including sensor measurements in the diagnostic assessment) to have the analysis server 24 focus its analysis on the desired workloads and/or time periods.

FIG. 2D depicts a user interface for reporting any computing systems and/or entities operating the computing systems which would benefit from a hardware upgrade, according to one embodiment. Such a user interface may be viewed by a sales representative of a computing system manufacturer. In one embodiment, analysis server 24 only sends the sales representative a list of computing systems for which poor performance has been observed and a performance affecting flaw has been ruled out. In the examples of FIG. 2A-2C, only computing system A was determined to be experiencing poor performance without a performance affecting flaw, so only computing system A is included in the list of FIG. 2D for a sales representative to follow up with. The reporting of computing systems for which hardware upgrades are recommended by analysis server 24 to sales representatives may occur in an automated fashion (e.g., bypassing any need for the support/engineering representative to assess the computing system's health, the sales representative to provide any input, etc.). More particularly, the only input that analysis server 24 processes in order to generate the list of computing systems that need hardware upgrades may be the telemetry (i.e., sensor measurements) automatically received from the computing systems.

FIG. 2E depicts a user interface for reporting any computing systems which should be investigated for possible performance affecting flaws, according to one embodiment. Such a user interface may be viewed by a support/engineering representative of a computer system manufacturer. In the example of FIGS. 2A-2C, computing systems 2 and 3 were determined to be experiencing performance affecting flaws, so these computing systems (along with any associated resources that were identified to be saturated) are identified in FIG. 2E as systems which should be investigated for possible performance affecting flaws. As before, the support/engineering representative need not provide inputs in order to generate the list of systems in FIG. 2E, and analysis server 24 can automatically and continuously maintain an updated list of computing systems that need to be investigated.

Figure 3:
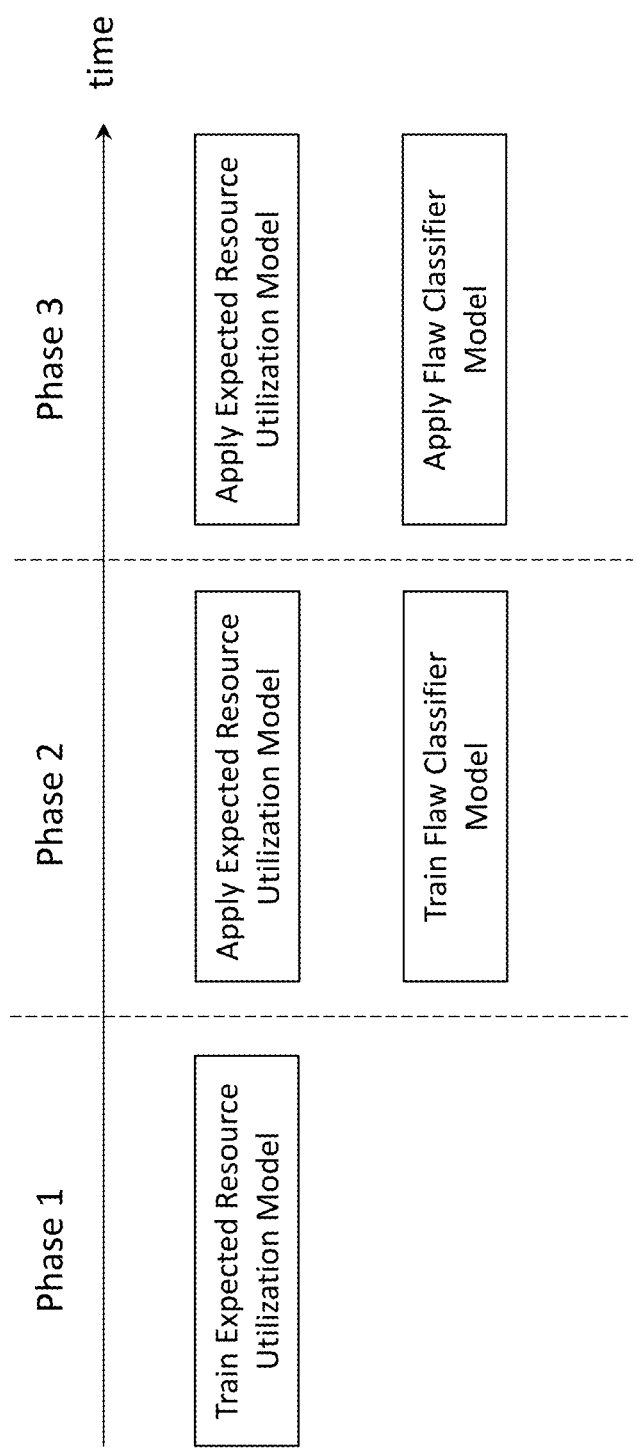
FIG. 3 depicts an overview of three phases of a process for classifying whether a computing system contains a flaw, according to one embodiment.

FIG. 3 depicts an overview of three phases of a process for classifying whether a system contains a flaw, according to one embodiment. In a first phase, an expected resource utilization model may be trained. Phase 1 is described below in association with FIG. 4. In a second phase, the expected resource utilization model may be applied while a flaw classifier model is trained. Phase 2 is described below in association with FIG. 5. In a third phase, both the expected resource utilization model and the flaw classifier model may be applied. Phase 3 is described below in association with FIG. 6. While phases 1 and 2 may employ fully supervised machine learning, later phases of training (not depicted) may employ semi-supervised machine learning, in which a human reviews a subset of model outputs and corrects the models as appropriate.

Figure 4:
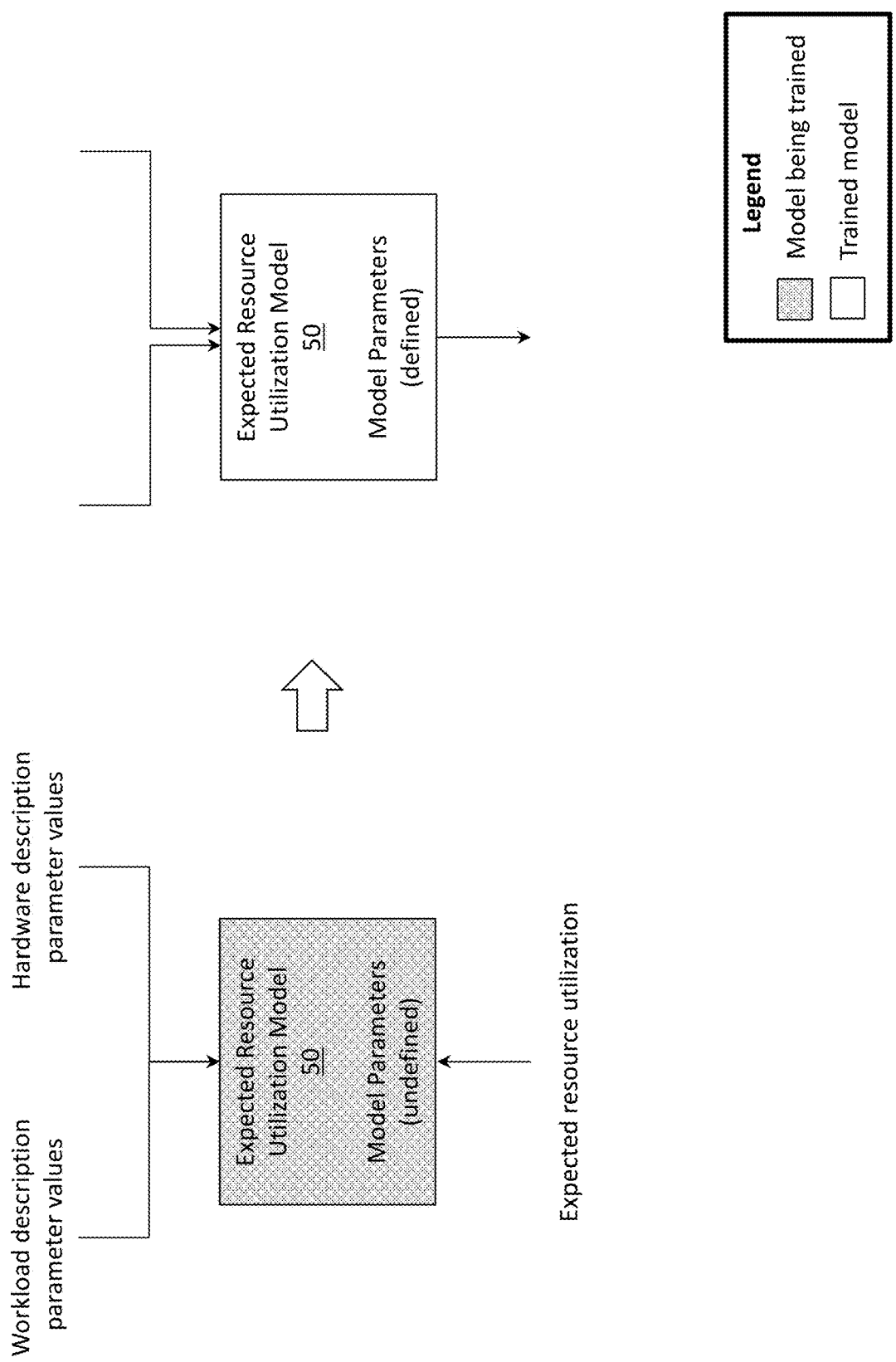
FIG. 4 depicts the training of an expected resource utilization model, according to one embodiment.

FIG. 4 depicts the training of expected resource utilization model 50, according to one embodiment. Inputs to expected resource utilization model 50 may include workload description parameters (and their associated values) and hardware description parameters (and their associated values). Workload description parameters may include input/output operations per second (IOPS), bandwidth or throughput measured in megabytes per second (MBPS), number of reads, number of writes, whether encryption is enabled or disabled, whether deduplication is enabled or disabled, snapshot and replication schedules, whether an offloaded data transfer (ODX) mechanism like XCOPY is being employed, etc. As described in FIG. 1, the values of workload description parameters may be measured via sensors embedded into the computing systems. Hardware description parameters may include CPU core count and type, HDD count and type, SSD count and type, RAM amount and type, a series of a computing system, etc. Hardware description parameters may also be received from the computing systems by monitoring server 20. Alternatively, hardware description parameters may be recorded at the time of sale of a computing system, and such hardware description parameters may be associated with a serial number of the computing system.

An output of expected resource utilization model 50 may include an expected resource utilization (i.e., an expected utilization of a resource of a computing system). An expected resource utilization may include an expected percentage of utilization of a CPU, an expected percentage of utilization of SSD bandwidth, an expected percentage of utilization of HDD bandwidth, etc.

In one embodiment, expected resource utilization model 50 may be a multivariate regression model (using supervised learning) that translates details of the hardware configuration and current operating workload into an estimate of the expected utilization levels of the resources of the system. Such a model can be implemented using linear or non-linear functional forms and optimization of the model can be performed using a variety of functions including but not limited to L1 (lasso) regularization or L2 (ridge) regularization or a combination thereof (e.g., ElasticNet regularization). The selection of the best functional form, optimization function, and thus the model parameters is subject to the size, scope, quality and other characteristics (e.g., covariance) of the training data set being used. In this way, any regression model form with its associated learning algorithm could be chosen to serve as an expected resource utilization model. What is important is that this model serves to collapse the complexity of assessing the performance of any specific computing system into a single variable (i.e., the expected resource utilization) relative to its peer group, allowing anomalies in resource utilization to be readily identified and acted upon.

During the training (i.e., human supervised training) of expected resource utilization model 50, a set of input (e.g., workload description parameters and values, hardware description parameter and values) with its associated output (e.g., expected resource utilization) is used to train the model parameters of expected resource utilization model 50. Therefore, while the expected resource utilization is an output of expected resource utilization model 50, it is shown as an input during the training phase (i.e., left side of FIG. 4). If a computing system is known to be free of performance affecting flaws, the actual resource utilization of the computing system may be used as the expected resource utilization during the training of expected resource utilization model 50. The trained version of expected resource utilization model 50 is depicted on the right side of FIG. 4, in which the specific implementation of the model (e.g., linear vs. nonlinear, regularized vs. non-regularized optimization, etc.) and its trained parameters (e.g., the coefficients in the regression model's function form) have been learned from the data.

In one embodiment, training of expected resource utilization model 50 may leverage machine-generated data, which may include the actual level of resource utilization, the details of the hardware configuration and current operating workload. This machine-generated data is collected either from internal systems (i.e., computing systems operated by a manufacturer of the computing system) undergoing QA (quality assurance) using synthetic workloads or from deployed customer systems in the field (i.e., computing systems operated by an enterprise) reporting their telemetry to analysis server 24. The training may include typical machine-learning processes: identifying the best specific regression model to use to attain the greatest accuracy, which is often performed through assessing the goodness of fit of many distinct regression models and picking the best model.

Further, it is noted that the expected resource utilization model 50 may be trained across various hardware configurations. In other words, the training data may include a system with 10 CPU cores, a system with 20 CPU cores, a system with 40 CPU cores, and so on. As a result, expected resource utilization model 50 may be used to predict the resource utilization for computing systems with various hardware configurations (and not just for a computing system with a specific hardware configuration).

Figure 5:
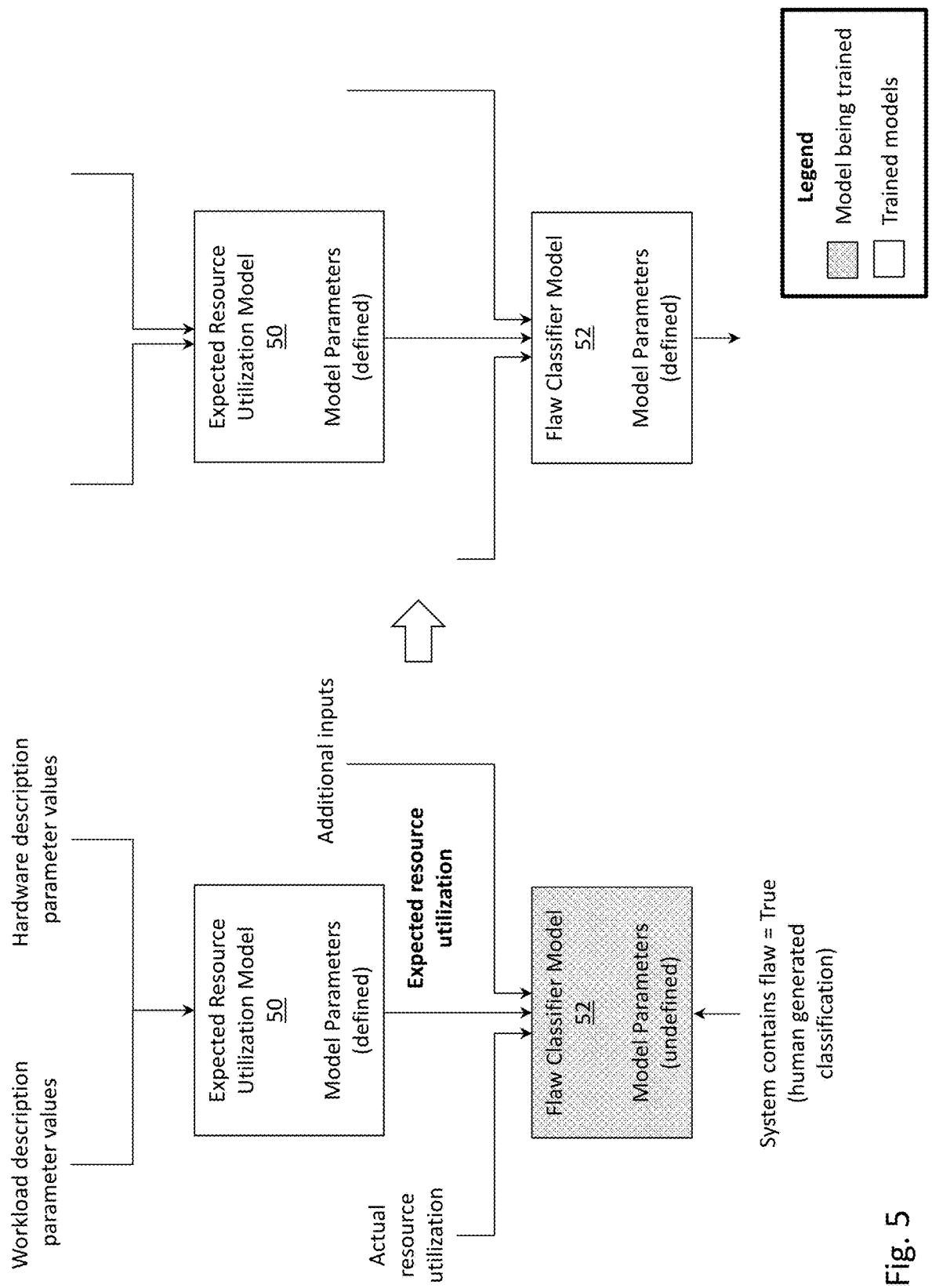
FIG. 5 depicts the training of a flaw classifier model, according to one embodiment.

FIG. 5 depicts the training of flaw classifier model 52, according to one embodiment. Flaw classifier model 52 may receive as input a measurement of the actual utilization of a resource of a computing system (i.e., the "actual resource utilization"). For example, flaw classifier model 52 may receive the actual CPU utilization, the actual SSD bandwidth saturation, the actual HDD bandwidth saturation, etc. Flaw classifier model 52 may additionally receive as input the expected resource utilization (i.e., the output of expected resource utilization model 50). For clarity in presentation, any output of models, such as the expected resource utilization, is depicted in bold font. If not already apparent, each actual resource utilization would correspond with an expected resource utilization (i.e., for each resource being analyzed, an actual utilization and an expected utilization would be provided for that resource). More generally, flaw classifier model 52 could receive a transformation of the actual resource utilization and the expected resource utilization (e.g., a difference of these two quantities, a ratio of these two quantities, etc.), instead of these two inputs. Flaw classifier model 52 may receive additional inputs, such as how a resource of the computing system is being used (e.g., the proportion of CPU usage by specific sub-modules of the operating system of the computing system), machine state variables, activity of a background task, etc. Using regularization, flaw classifier model 52 can also identify certain variables to exclude as inputs in order to avoid overfitting the model.

An output of flaw classifier model 52 may indicate whether or not the computing system contains a performance affecting flaw. More generally, the classification need not be binary, and could be expressed as a likelihood or probability that the computing system contains a performance affecting flaw. Intuitively, the flaw classifier model is designed to classify the computing system as containing a flaw whenever the actual resource utilization is substantially higher than the expected resource utilization. In a simplistic scheme, a simple threshold could be utilized (e.g., determine a flaw to be present if the actual resource utilization minus the expected resource utilization is greater than a threshold). Such a simplistic scheme, however, would not capture any complexities that may be present (e.g., the information contained in the additional inputs which could indicate whether a flaw is present or not). Therefore, in the more comprehensive approach of FIG. 5, a flaw classifier model (trained via machine learning) is used to generate the classification of whether the computing system contains a flaw.

In one embodiment, a flaw classifier model is a classification model that can, among other inputs, utilize both the actual resource utilization and expected resource utilization (as provided by expected resource utilization model 50) as an input. The flaw classifier model can be implemented using a variety of supervised learning methods including but not limited to linear discriminant analysis, logit, naive Bayes, random forests, support vector machines and various neural network topologies. Similar to the expected resource utilization model, the selection of the best functional form, optimization function, and thus the model parameters is subject to the size, scope, quality and other characteristics (e.g. covariance) of the training data set being used. In this way, any classification model form with its associated learning algorithm could be chosen to serve as a flaw classifier model. What is important is that the flaw classifier model serves to make a binary decision as to whether or not the specific set of signals it receives constitutes a potential corner-case flaw in the computing system under investigation.

More specifically, two types of flaw classifier models may be employed: "a general flaw classifier model" and "a specific flaw classifier model". A purpose of the "general flaw classifier model" is to identify whether any corner-case (i.e., uncommon) anomaly is impacting the performance of the computing system, while a purpose of the "specific flaw classifier model" is to identify whether a specific, known, corner-case anomaly is impacting the performance of the computing system.

During the training (e.g., human supervised training) of flaw classifier model 52, a set of input (e.g., actual resource utilization, expected resource utilization, additional inputs) and a human provided classification of whether the computing system contains a performance affecting flaw are used to train the model parameters of flaw classifier model 52. Therefore, while the classification of whether the computing system contains a performance affecting flaw is an output of flaw classifier model 52, it is shown as an input during the training phase (i.e., left side of FIG. 5). The trained version of flaw classifier model 52 is depicted on the right side of FIG. 5, in which the model parameters have been determined.

The training data for flaw classifier model 52 could be from a single computer system, computer systems with similar hardware configurations or computer systems with different hardware configurations. Flaw classifier model 52, however, need not take hardware description parameters (e.g., the number of CPU cores as an input), because each computing system reports its actual resource utilization as a percent, and expected resource utilization model 50 presents the expected resource utilization also as a percent. Because flaw classifier model 52 is primarily using the deviation between the expected resource utilization percentage and the actual resource utilization percentage (potentially in conjunction with information about how the resource's total utilization is being partitioned among various sub-processes), the variations in hardware configurations need not be explicitly modeled in flaw classifier model 52. After all, these variations have been accounted for in expected resource utilization model 50.

In one embodiment, training of flaw classifier model 52 may utilize, in addition to the data described above, a repository of example time intervals of telemetry labeled by customer support (i.e., a support/engineering representative of a computing system manufacturer) as representing a manifestation of one or more performance affecting flaws. These expert provided labels serve as the information that is being learned by the flaw classifier model. Because in any set of flaws there is often a significant variance in how often the flaws are observed, the more frequently observed flaws may constitute enough of a training set for a "specific flaw classifier model" to be created that classifies that event with sufficient accuracy to be productized. In contrast, many of the other flaws will not be observed a sufficient number of times for a "specific flaw classifier model" to be generated for each one. Because each of these more rarely occurring flaws will have a decrease in performance as part of how they manifest themselves, the whole collection of less commonly observed flaws (in conjunction with the more common ones) can be used to train a more "general flaw classifier model" that captures the general pattern of a performance-impacting flaw, without being overly specific. In this way, a "general flaw classifier model" can be used to indicate that a flaw is expected to exist even when the specific flaw cannot be identified. Indeed, a "general flaw classifier model" has a good likelihood of also identifying that a flaw exists even in cases where the specific flaw manifesting in that case has not previously been identified or labeled.

Figure 6:
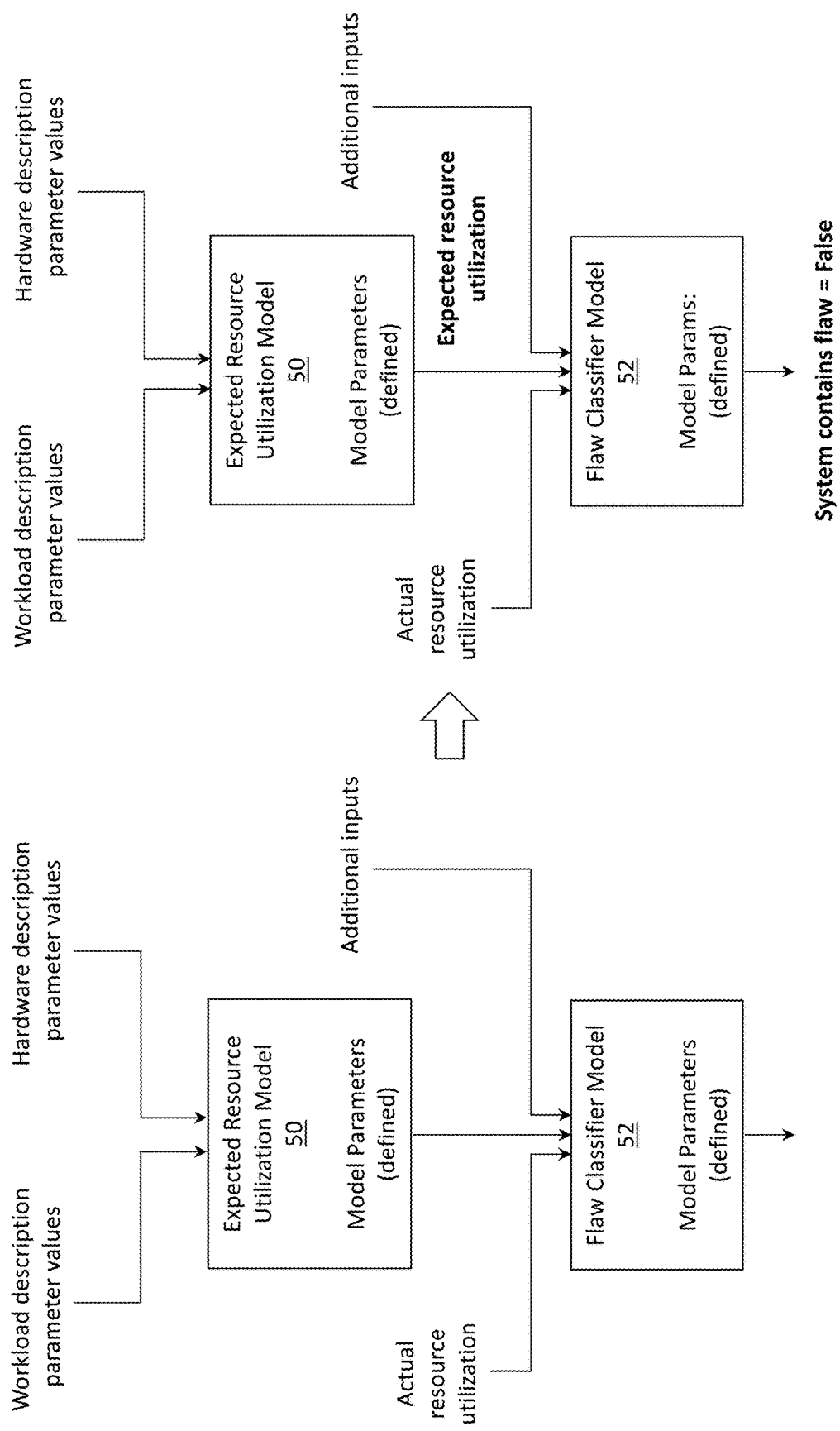
FIG. 6 depicts an application of the expected resource utilization model and the flaw classifier model, according to one embodiment.

FIG. 6 depicts an application of expected resource utilization model 50 and flaw classifier model 52, according to one embodiment. The left side of FIG. 6 depicts various input parameters being supplied to expected resource utilization model 50 and flaw classifier model 52. The right side of FIG. 6 depicts respective outputs (in bold) generated by expected resource utilization model 50 and flaw classifier model 52. Expected resource utilization model 50 generates an output of expected resource utilization which is provided as an input to flaw classifier model 52. In turn, flaw classifier model 52 generates a classification of whether the computing system contains a flaw. In the example of FIG. 6, the computing system is classified as not containing a flaw (i.e., as depicted, "System contains flaw=False"). Because flaw classifier model 52 classifies rare events, the efficacy of the model's classification may be quantified using precision-recall curves (PR curves). A precision-recall curve enables the user of a classifier to select a threshold for the classifier's probabilistic output, so that its continuous 0-1 interval output can be converted into a binary output based upon the appropriate tradeoff between precision and recall for the particular use case.

Figure 7:
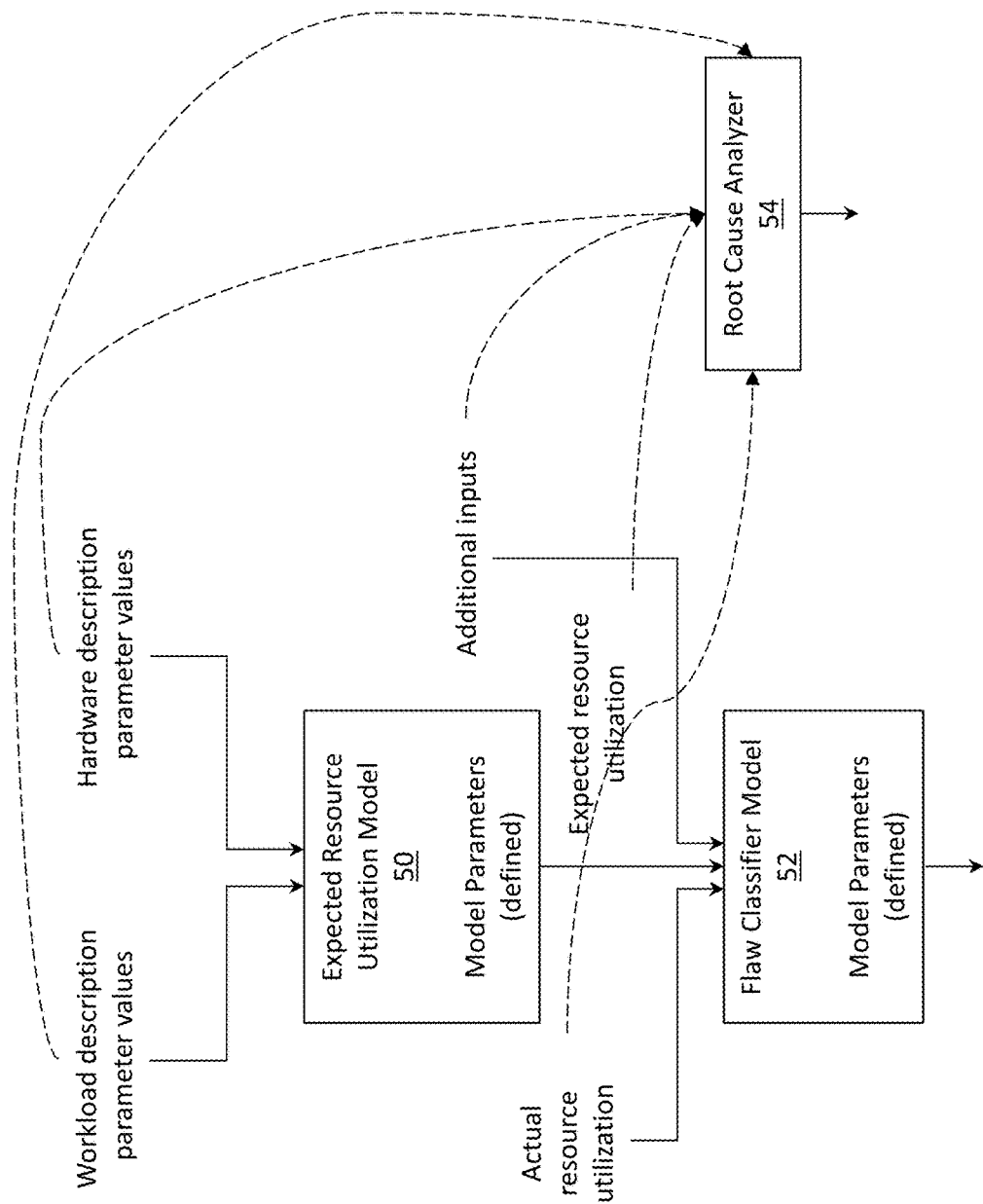
FIG. 7 depicts a root cause analyzer that may be employed in conjunction with the flaw classifier model, according to one embodiment.

FIG. 7 depicts root cause analyzer 54 that may be employed in conjunction with expected resource utilization model 50 and flaw classifier model 52, according to one embodiment. Root cause analyzer 54 may receive as input any of the data signals depicted in FIG. 7 (e.g., workload description parameter values, hardware description parameter values, actual resource utilization, expected resource utilization, additional inputs), and may identify the root cause of a flaw. More generally, root cause analyzer 54 may provide information (e.g., a correlated anomalous condition) that might assist a support/engineering representative determine the root cause of the flaw. As a specific example, the actual CPU utilization being substantially in excess of the expected CPU utilization may be due to a specific background task. Root cause analyzer 54 may detect a correlation between the activity of this background task (as measured by sensors and provided as "additional inputs" in FIG. 7) and the degree to which the actual CPU utilization exceeds the expected CPU utilization, and as a result report the background task as a root cause or a correlated anomalous condition of the excess CPU utilization.

Figure 8A:
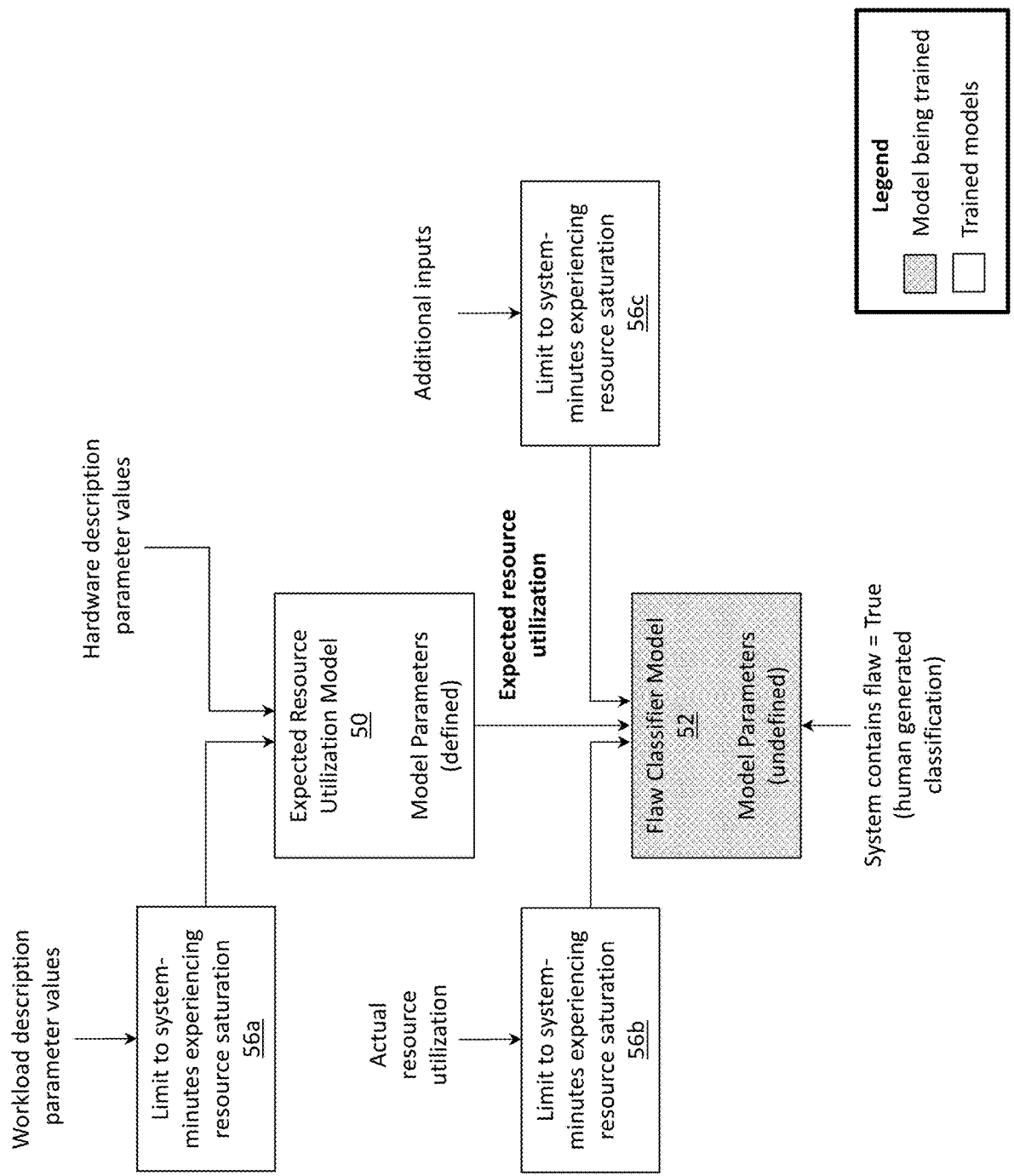
FIG. 8A depicts the training of the flaw classifier model, when limited to data gathered during time periods with resource saturation, according to one embodiment.
Figure 8B:
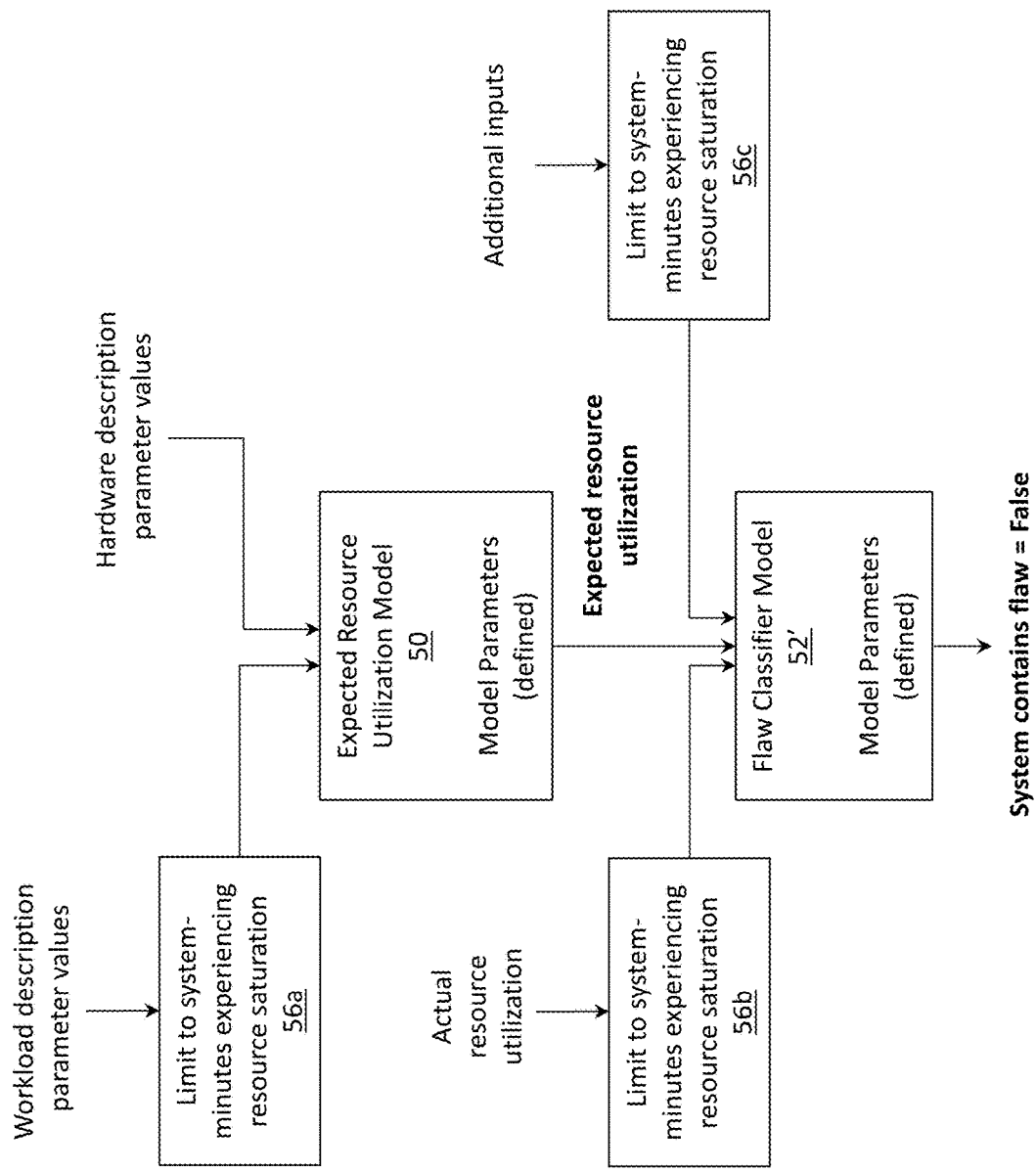
FIG. 8B depicts the application of the expected resource utilization model and the flaw classifier model, when limited to data gathered during time periods with resource saturation, according to one embodiment.

FIG. 8A depicts the training of the flaw classifier model and FIG. 8B depicts the application of the expected resource utilization model and the flaw classifier model, when limited to data gathered during time periods with resource saturation, according to one embodiment. Resource saturation occurs when the actual resource utilization has reached or exceeded a level over which a degradation in the performance (e.g., measured in terms of the read latency, the write latency or both) of the computing system is present. Quantitatively, this level may be computed as the resource utilization percentage at which P(unhealthy|resource utilization percentage) (i.e., the probability of the computing system being unhealthy given the resource utilization percentage) is greater than 50% (or another threshold value). The notion of a computing system as being "unhealthy" is defined with respect to the performance of a computing system relative to the performance of similar computing systems (i.e., called peer performance). The performance of a computing system in the top 10% of the peers may be defined as healthy, whereas the performance of a computing system in the remaining 90% of the peers may be defined as unhealthy.

More specifically, P(unhealthy|'x') may be calculated as (P('x'|unhealthy)*P(unhealthy))/P('x'), where 'x' may represent a performance characteristic such as the resource utilization percentage. Based on the definition of healthy vs. unhealthy, a performance characteristic will either fall into the healthy or the unhealthy category. It follows that P(healthy)+P(unhealthy)=0.1+0.9=1 and that P('x')=P('x'|healthy)P(healthy)+P('x'|unhealthy)P(unhealthy). By substituting the expression for P('x') into the previous expression for P(unhealthy|'x'), P(unhealthy|'x') may be calculated as (P('x'|unhealthy)*P(unhealthy))/(P('x'|healthy)P(healthy)+P('x'|unhealthy)P(unhealthy)).

Therefore, P(unhealthy|'x') is now expressed in terms of known quantities and/or quantities that can be measured: P('x'|unhealthy), P('x'|healthy), P(unhealthy) and P(healthy).

As depicted in FIG. 8A, the training of the flaw classifier model may be limited to data gathered during time periods when the computing system experiences resource saturation. The limiting of the data may be performed by modules 56a, 56b and 56c which only pass workload description parameter values, actual resource utilization and additional inputs, respectively, that are gathered during time periods when the computing system experiences resource saturation. In the example of FIG. 8A, each time period for data collection is one minute in duration, and hence the data gathered over a one-minute time period is referred to as a "system-minute" in FIG. 8A.

As depicted in FIG. 8B, the application of expected resource utilization model 50 and flaw classifier model 52' (for which the model parameters may be different than flaw classifier model 52) may likewise be limited to data gathered during time periods when the computing system experiences resource saturation. Such limiting of input data may also utilize modules 56a, 56b and 56c. Since system resource saturation can often fluctuate from minute-to-minute even if the longer time interval is generally representative of either "resource underprovisioning" or "resource saturation due to a flaw or other system anomaly", it can be important to remove data collected during certain minutes during which the resource is not saturated to remove noise from the signal. The inventors find this to be a superior method of cleansing the training data than unsupervised methods, since exclusion of data can be based on an explicit signal. In the example of FIGS. 8A and 8B, it is noted that the training of expected resource utilization model 50 was not limited to data gathered during time periods with resource saturation. In other words, it was assumed that expected resource utilization model 50 was trained following the approach of FIG. 4. However, it is possible that the training of expected resource utilization model 50 to likewise be limited to data gathered during time periods with resource saturation.

FIG. 9 depicts a table illustrating various resource utilization scenarios (e.g., excess resource utilization with and without resource saturation, normal resource utilization with and without resource saturation), according to one embodiment. Row (a) illustrates a scenario in which excess resource utilization is absent (since the actual resource utilization is only slightly higher than the expected resource utilization), but resource saturation is present (since the actual utilization is within the shaded band—representing the range of resource utilization characterized as being resource saturated). If the scenario of (a) were analyzed by flaw classifier model 52, the flaw classifier model might classify the computing system as not containing a flaw, since the actual utilization is comparable to the expected resource utilization. In response to the computing system being classified as not containing a flaw and the computing system exhibiting resource saturation, analysis server 24 may recommend the operator of the computing system to apply IOPS limits, stagger the workload and/or upgrade the hardware (i.e., similar to the recommendation provided in FIG. 2A).

Row (b) illustrates a scenario in which excess resource utilization is present (since the actual resource utilization is much higher than the expected resource utilization), and resource saturation is also present (since the actual utilization is within the shaded band). If the scenario of (b) were analyzed by flaw classifier model 50, the flaw classifier model might classify the computing system as containing a flaw, since the actual resource utilization is much higher than the expected resource utilization. In response to the computing system being classified as containing a flaw and the computing system exhibiting resource saturation, analysis server 24 may recommend the operator of the computing system to apply IOPS limits, stagger the workload, and/or contact customer support. Such recommendation is similar to the recommendation provided in FIG. 2B.

Row (c) illustrates a scenario in which excess resource utilization is absent (since the actual resource utilization is less than the expected resource utilization), and resource saturation is also absent (since the actual utilization is outside of the shaded band). If the scenario of (c) were analyzed by flaw classifier model 50, the flaw classifier model might classify the computing system as not containing a flaw, since the actual resource utilization is comparable to the expected resource utilization. In response to the computing system being classified as not containing a flaw and the computing system not exhibiting resource saturation, analysis server 24 may provide no recommendation, as no remediation measure is needed.

Row (d) illustrates a scenario in which excess resource utilization is present (since the actual resource utilization is much higher than the expected resource utilization), but resource saturation is absent (since the actual utilization is outside of the shaded band). Such a scenario might be associated with "headroom" loss. Headroom generally refers to the amount of resource that is left unconsumed (i.e., a buffer in resources for the computing system to grow into). As such, headroom loss refers to a loss in this buffer of resources, which would occur prior to the computing system suffering any noticeable performance degradation. If the scenario of (d) were analyzed by flaw classifier model 50, the flaw classifier model might classify the computing system as containing a flaw, since the actual resource utilization is much higher than the expected resource utilization. In response to the computing system being classified as containing a flaw and the computing system not exhibiting resource saturation, analysis server 24 may provide the operator of the computing system with no remediation measures (similar to FIG. 2C), but would flag the computing system for internal investigation (i.e., investigation by a support/engineering representative of the computing system manufacturer).

Figure 10:
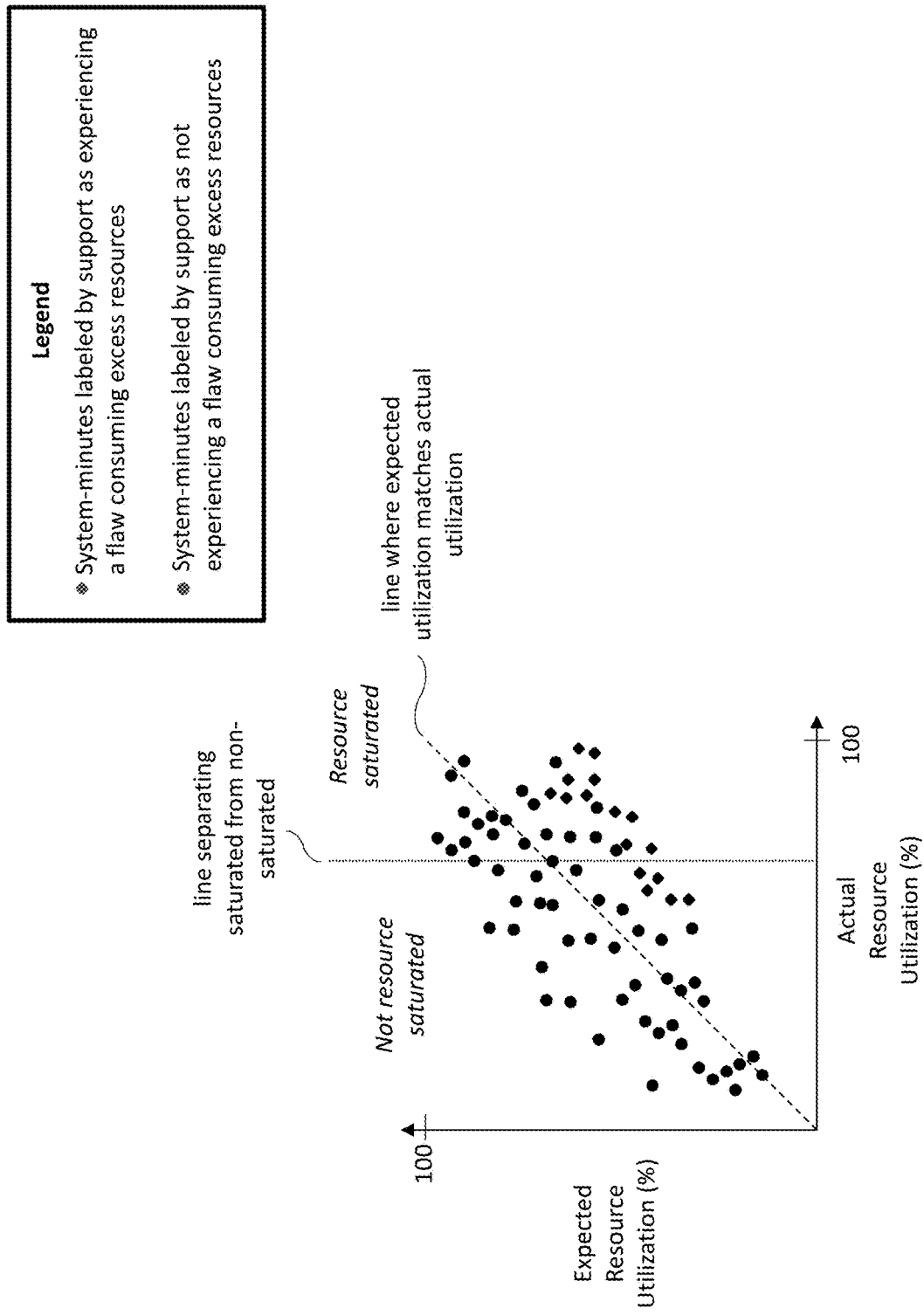
FIG. 10 depicts data points formed by two dimensions of possible training data for the flaw classifier model, according to one embodiment.

FIG. 10 depicts data points formed by two dimensions of possible training data for the flaw classifier model (i.e., expected resource utilization percentage and actual resource utilization percentage), according to one embodiment. Diamond shaped data points correspond to "system-minutes" (i.e., data points generated by sensor measurements measured over a minute of time) labeled by support (i.e., a support/engineering representative) as experiencing a flaw consuming excess resources (i.e., more resources than expected). In the example of FIG. 10, data points correspond to sensor measurements collected over a minute of time, but it is understood that sensor measurement may be collected over another period of time greater or shorter than a minute. Circular shaped data points correspond to system-minutes labeled by support as not experiencing a flaw consuming excess resources.

As expected, the diamond shaped data points (flaw=True) all lie far to the right of the dashed line denoting the expected resource utilization being equal to the actual resource utilization. In other words, all of the diamond shaped data points correspond to the scenarios in which the actual resource utilization was substantially higher than the expected resource utilization. Also expected are circular shaped data points (flaw=False) on the right side of and proximate to the dashed line. These circular shaped data points correspond to scenarios in which the actual resource utilization was only slightly higher than the expected resource utilization, and no flaw was detected. Less expected are circular shaped data points (flaw=False) far to the right side of the dashed line. These circular shaped data points correspond to scenarios in which the actual resource utilization was substantially higher than the expected resource utilization, and no flaw was detected. Such unexpected data points illustrate the need for a flaw classifier model, as opposed to relying upon a simple threshold-based scheme to classify flaws.

Also illustrated in FIG. 10 is a dotted vertical line separating data points with resource saturation from data points without resource saturation. In other words, data points with an actual resource utilization percentage greater than a certain threshold are considered to be resource saturated, whereas data points with an actual resource utilization percentage less than the threshold are considered to be not resource saturated.

Figure 11:
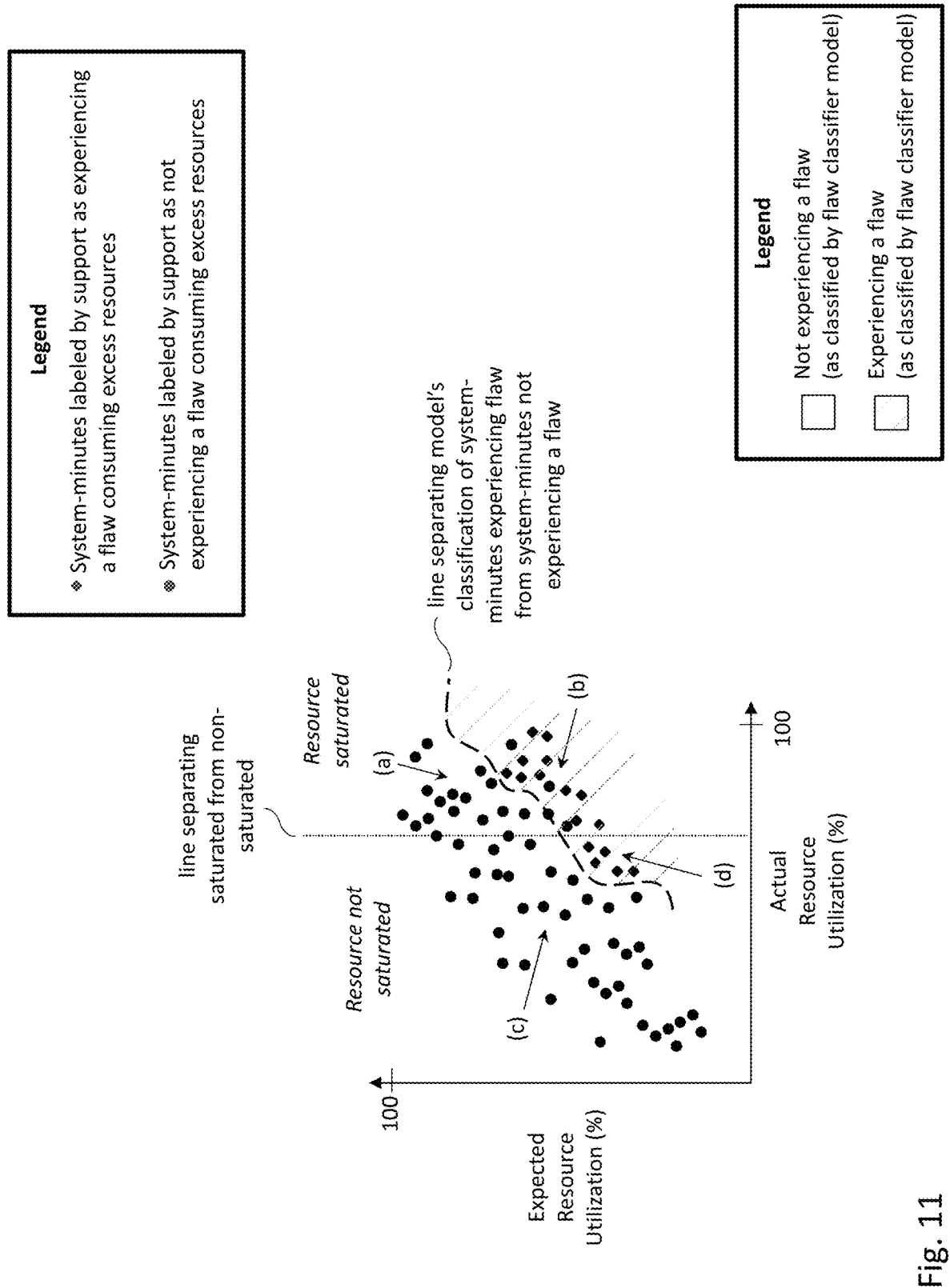
FIG. 11 depicts the flaw classifier model's classification superimposed on the data points of FIG. 10, according to one embodiment.

FIG. 11 depicts the flaw classifier model's classification superimposed over the data points of FIG. 10. In some instances like the example in FIG. 11, the flaw classifier model will be a non-linear model (i.e., classification is not a straight line). In this example, all of the system-minutes classified as experiencing a flaw by a human are also classified as experiencing a flaw by the flaw classifier model (i.e., all diamond shaped data points are located to the right of the dashed line). On the other hand, a few system-minutes classified as not experiencing a flaw by a human are classified as experiencing a flaw by the flaw classifier model (i.e., a few circle shaped data points are located to the right of the dashed line). This is not surprising as models, in general, may have some degree of error (e.g., since models may not have access to all inputs that a human has available). Further, it is possible that the human classification had errors (i.e., some of the circle shaped data points should have actually been diamond shaped).

The four quadrants formed by the dotted vertical line (delineating saturated from non-saturated data points) and the dashed line (delineating data points classified as experiencing flaws from data point not experiencing flaws by the flaw classifier model) compactly illustrate the four scenarios of FIG. 9 in a single plot. The upper right quadrant of FIG. 11 corresponds to row (a) of FIG. 9 in which the flaw classifier model determined a flaw to not be present, but resource saturation was present. The lower right quadrant of FIG. 11 corresponds to row (b) of FIG. 9 in which the flaw classifier model determined a flaw to be present, and resource saturation was present. The upper left quadrant of FIG. 11 corresponds to row (c) of FIG. 9 in which the flaw classifier model determined a flaw to not be present, and resource saturation was likewise not present. Finally, the lower left quadrant of FIG. 11 corresponds to row (d) of FIG. 9 in which the flaw classifier model determined a flaw to be present, and resource saturation was not present.

Figure 12:
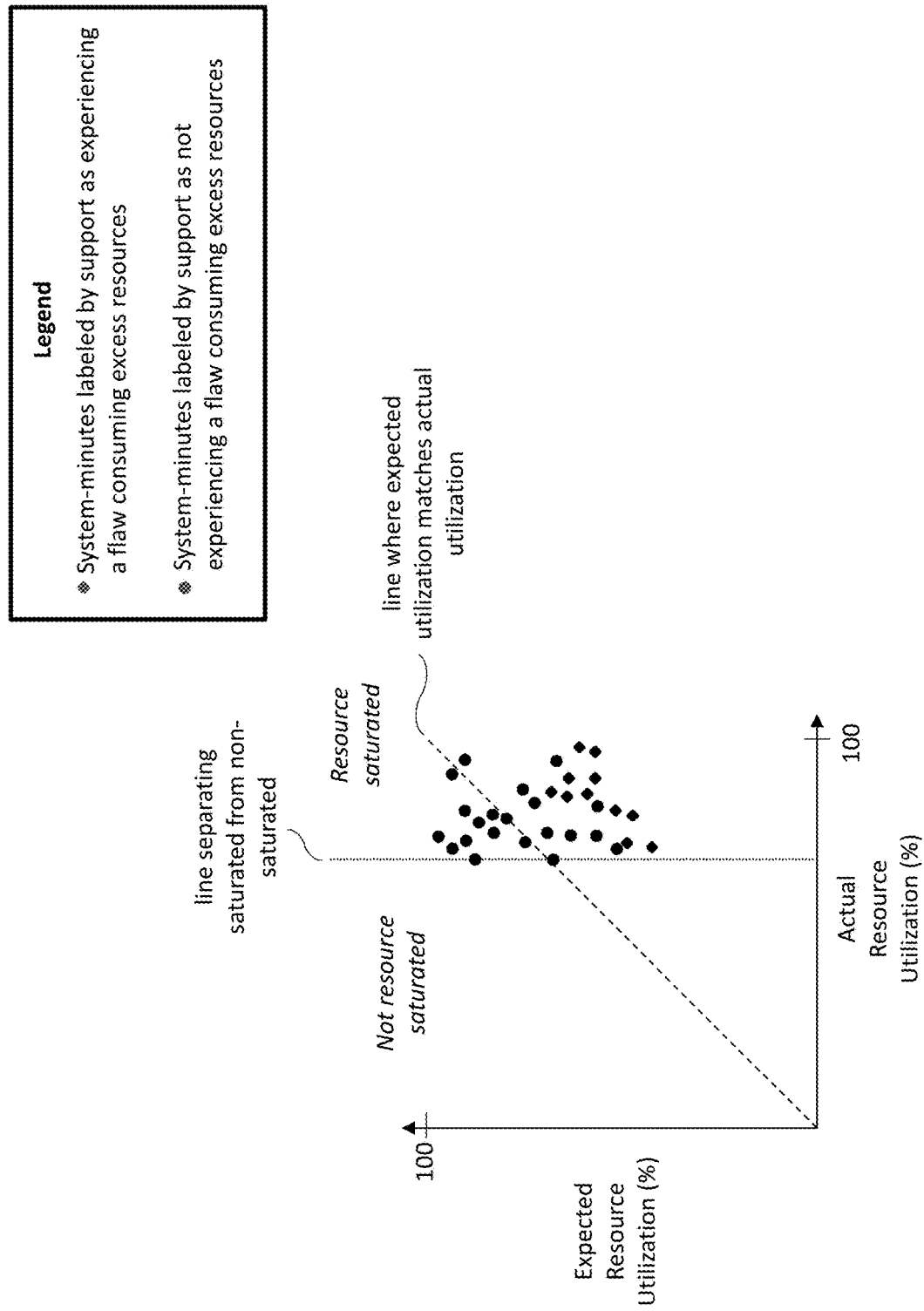
FIG. 12 depicts data points formed by two dimensions of possible training data for the flaw classifier model (limited to data collected during time periods with resource saturation), according to one embodiment.

FIG. 12 depicts the same data points as FIG. 10, except limited to data collected during time periods with resource saturation. Such data points may be used to train the flaw classifier model of FIG. 8A.

Figure 13:
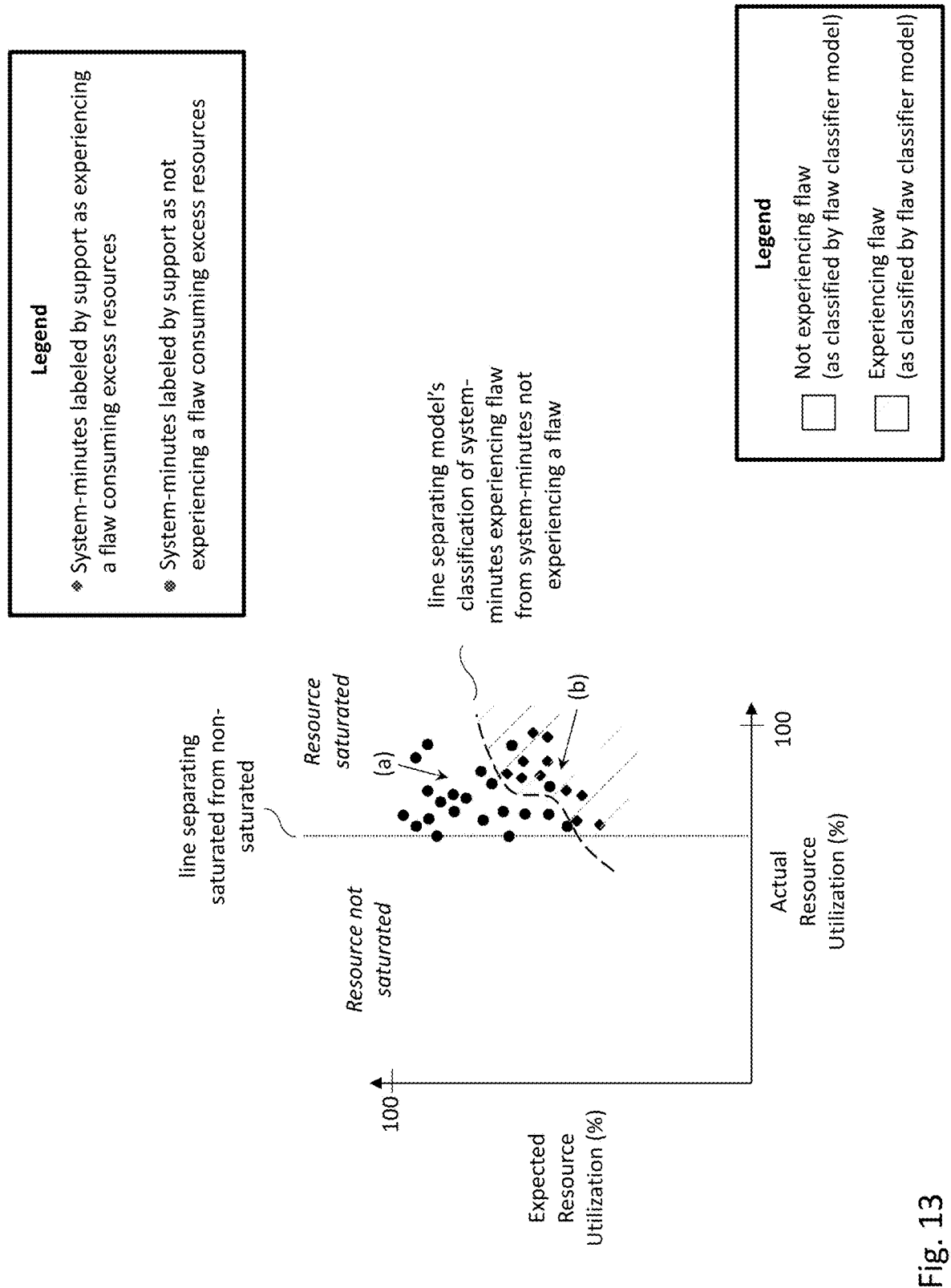
FIG. 13 depicts the flaw classifier model's classification superimposed on the data points of FIG. 12, according to one embodiment.

FIG. 13 depicts the flaw classifier model's classification superimposed on the data points of FIG. 12. If not already apparent, the flaw model's classification in FIG. 13 is different from the flaw model's classification in FIG. 11, because the respective flaw models were trained with different data (i.e., flaw model of FIG. 11 was trained over data points of FIG. 10, whereas flaw model of FIG. 13 was trained over data points of FIG. 12). The two regions of FIG. 13 formed by the flaw classifier model correspond to rows (a) and (b) of FIG. 9. More specifically, the top region of FIG. 13 corresponds to row (a) in which the flaw classifier model determined a flaw to not be present, but resource saturation was present. The bottom region of FIG. 13 corresponds to row (b) in which the flaw classifier model determined a flaw to be present, and resource saturation was also present.

Figure 14:
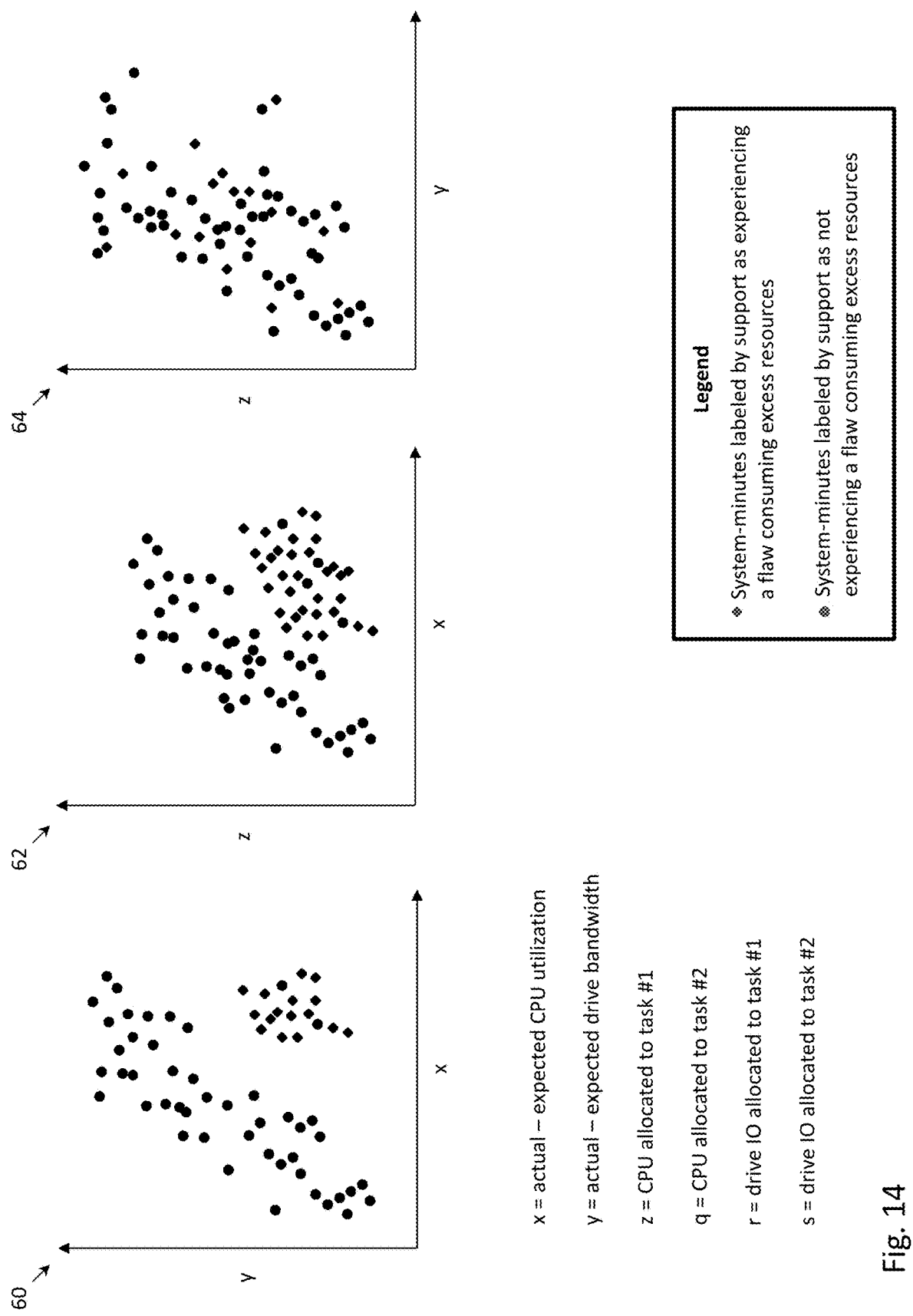
FIG. 14 depicts several plots showing the pairwise combination of several input variables to the flaw classifier model, according to one embodiment.

FIG. 14 depicts plots showing the pairwise combination of several input variables (e.g., x, y, z, q, r, s, . . . ) to the flaw classifier model, according to one embodiment. x may represent the actual CPU utilization minus the expected CPU utilization; y may represent the actual drive bandwidth minus the expected drive bandwidth; z may represent the CPU allocated to task number 1; q may represent the CPU allocated to task number 2; r may represent the drive input-output (TO) allocated to task number 1; s may represent the drive IO allocated to task number 1; and so on. Plot 60 is a scatter plot of the actual drive bandwidth minus the expected drive bandwidth versus the actual CPU utilization minus the expected CPU utilization. Plot 62 is a scatter plot of the CPU allocated to task number 1 versus the actual CPU utilization minus the expected CPU utilization versus. Plot 64 is a scatter plot of the CPU allocated to task number 1 versus the actual drive bandwidth minus the expected drive bandwidth. Additional plots for other pairings of variables could likewise be generated.

As in the previous figures, diamond shaped data points correspond to system-minutes labeled by support as experiencing a flaw consuming excess resources and circular shaped data points correspond to system-minutes labeled by support as not experiencing a flaw consuming excess resources. Any non-uniformity present in how the diamond data points are distributed as compared to how the circular data points are distributed may indicate a pairing of variables that could be useful as inputs to a flaw classifier model. In plots 60 and 62, there is some non-uniformity in how the diamond data points are distributed as compared to how the circular data points are distributed, indicating that the pairing of x and y, and the pairing of x and z could be useful inputs for the flaw classifier model. In contrast, in plot 64, the diamond data points and the circular data points are distributed quite uniformly (i.e., mixed together), indicating that the pairing of y and z (at least without other input variables) would not likely be useful inputs for the flaw classifier model.

Figure 15:
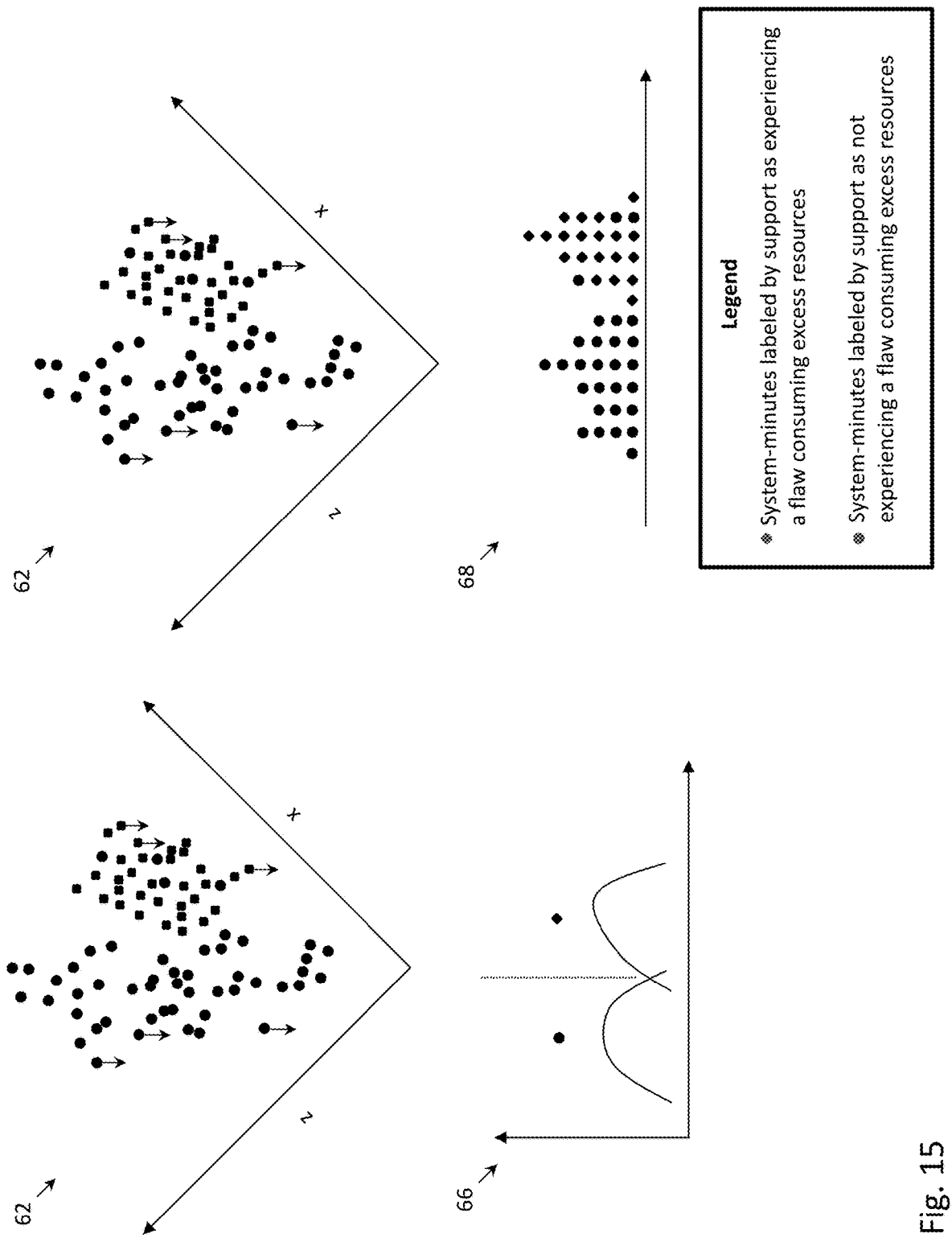
FIG. 15 depicts histogram visualizations of the data points of one of the plots of FIG. 14 replotted on a single axis using a dimensionality reduction technique (e.g., linear discriminant), according to one embodiment.

FIG. 15 depicts histogram visualizations of plot 62 replotted on a single axis through a dimensionality reduction technique (e.g., linear discriminant), according to one embodiment. In a simplified explanation, one can imagine plot 62 being rotated and the data points being projected downward onto a single axis to form histogram 66, which displays a count of the number of diamond data points and a count of the number of circular data points over this single axis. The meaning of the transformed axis is not important (and hence it is not labeled), but what is important is whether any bifurcation (or other non-uniformity) exists in the distribution of diamond data points versus the distribution of circular data points. If a bifurcation exists, then the pairing of variables could be useful as input to the flaw classifier model. Histogram 68 is similar to histogram 66, except for the manner in which the histogram is presented (using stacks of data points to represent a count instead of using a line plot).

Figure 16:
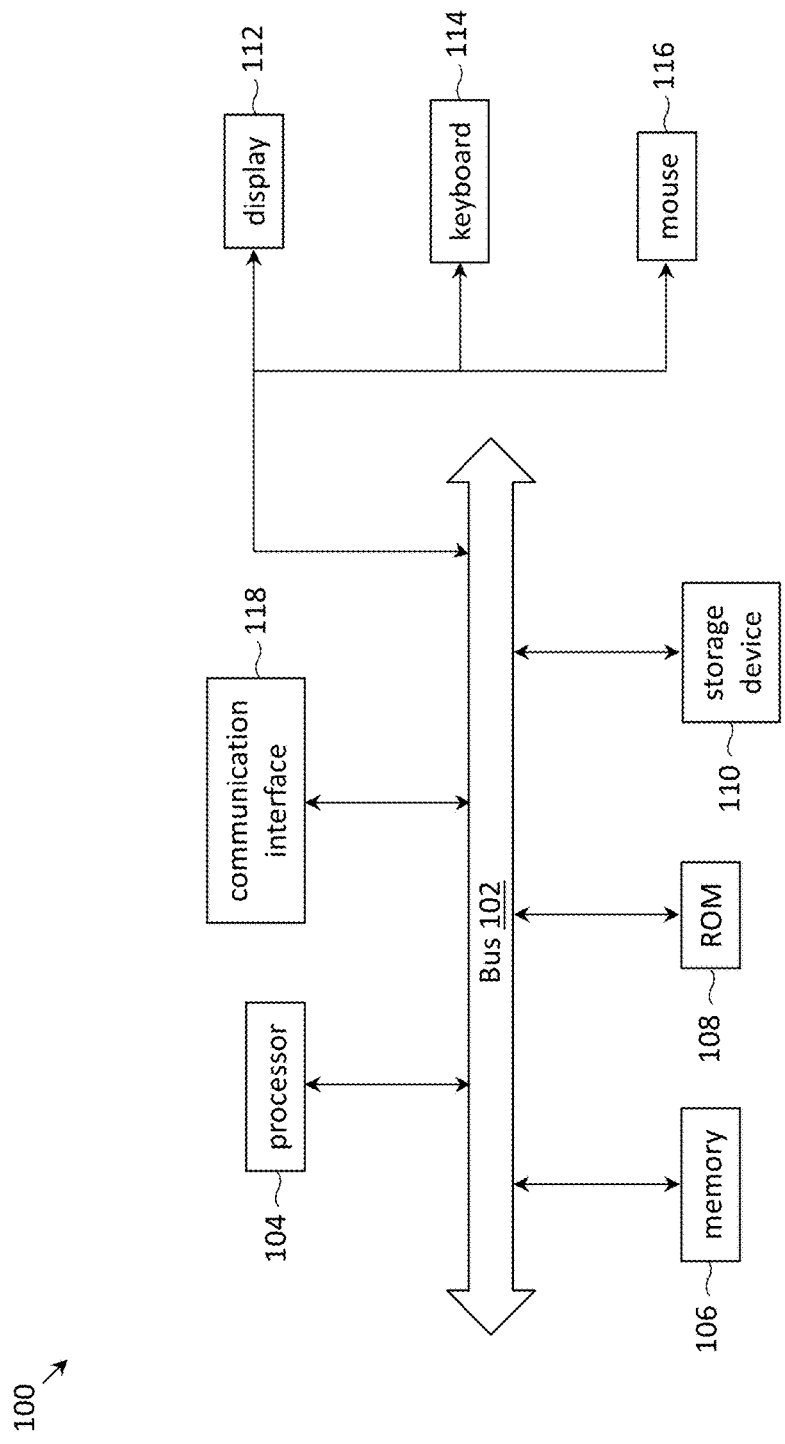
FIG. 16 depicts example components of a computer system in which computer readable instructions instantiating embodiments described herein may be stored and executed.

FIG. 16 provides an example of system 100 that is representative of any of monitoring server 20, analysis server 24, or client devices 28, 30, 32, 34 and 36 depicted above in FIG. 1 (i.e., any processor-based system). Note, not all of the various processor-based systems which may be employed in accordance with embodiments described herein have all of the features of system 100. For example, certain processor-based systems may not include a display inasmuch as the display function may be provided by a client computer communicatively coupled to the processor-based system or a display function may be unnecessary.

System 100 includes a bus 102 or other communication mechanism for communicating information, and a processor 104 coupled with the bus 102 for processing information. System 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. System 100 further includes a read only memory (ROM) 108 or other static storage device coupled to the bus 102 for storing static information and instructions for the processor 104. A storage device 110, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 104 can read, is provided and coupled to the bus 102 for storing information and instructions (e.g., operating systems, applications programs and the like).

System 100 may be coupled via the bus 102 to a display 112, such as a flat panel display, for displaying information to a user. An input device 114, such as a keyboard including alphanumeric and other keys, may be coupled to the bus 102 for communicating information and command selections to the processor 104. Another type of user input device is cursor control device 116, such as a mouse, a trackball, or cursor direction keys for communicating direction information and command selections to processor 104 and for controlling cursor movement on the display 112. Other user interface devices, such as microphones, speakers, etc. are not shown in detail but may be involved with the receipt of user input and/or presentation of output.

The processes referred to herein may be implemented by processor 104 executing appropriate sequences of processor-readable instructions stored in main memory 106. Such instructions may be read into main memory 106 from another processor-readable medium, such as storage device 110, and execution of the sequences of instructions contained in the main memory 106 causes the processor 104 to perform the associated actions. In alternative embodiments, hard-wired circuitry or firmware-controlled processing units (e.g., field programmable gate arrays) may be used in place of or in combination with processor 104 and its associated computer software instructions to implement functionalities described herein. The processor-readable instructions may be rendered in any computer language.

System 100 may also include a communication interface 118 coupled to the bus 102. Communication interface 118 may provide a two-way data communication channel with a computer network, which provides connectivity to the plasma processing systems discussed above. For example, communication interface 118 may be a local area network (LAN) card to provide a data communication connection to a compatible LAN, which itself is communicatively coupled to other computer systems. In embodiments, any suitable communication paths may be used for system 100 to send and receive messages and data through the communication interface 118 and in that way communicate with other controllers, etc.

It is to be understood that the above-description is intended to be illustrative, and not restrictive. Many other embodiments will be apparent to those of skill in the art upon reviewing the above description.

What is claimed is:

1. An analysis server for analyzing a first computing system, comprising:
    a processor;
    a storage device communicatively coupled to the processor; and
    instructions on the storage device that, when executed by the processor, cause the processor to:
        determine, using an expected resource utilization model, an expected utilization of a resource of the first computing system based on workload description parameter values and hardware description parameter values regarding the first computing system;
        receive a measurement of an actual utilization of the resource of the first computing system;
        classify, using a flaw classifier model, the first computing system as one which contains or does not contain one or more flaws that affect a performance of the first computing system, the classification based on the expected utilization of the resource and the actual utilization of the resource;
        when the resource of the first computing system is saturated, determine which of multiple different recommendations to provide depending on whether the first computing system is classified as one which contains one or more flaws; and
        when the resource of the first computing system is not saturated, determine whether to flag the first computing system depending on whether the first computing system is classified as one which contains one or more flaws.

2. The analysis server of claim 1, wherein the expected resource utilization model is trained over a plurality of computing systems having differing hardware configurations.

3. The analysis server of claim 1, wherein training data provided to the flaw classifier model include human-labeled measurements of the first computing system, at least one of the human-labeled measurements being characteristic of the first computing system experiencing one or more flaws, and at least one of the human-labeled measurements not being characteristic of the first computing system experiencing one or more flaws.

4. The analysis server of claim 1, wherein the instructions are to cause the processor to:
    when the resource of the first computing system is saturated and the first computing system is classified as one which does not contain one or more flaws, recommend one or more of a hardware upgrade and a workload attenuation to an operator of the first computing system.

5. The analysis server of claim 4, wherein the instructions are to cause the processor to:
    when the resource of the first computing system is saturated and the first computing system is classified as one which contains one or more flaws, recommend the operator of the first computer system to contact customer support to receive remediation steps.

6. The analysis server of claim 5, wherein the instructions are to cause the processor to:
    when the resource of the first computing system is not saturated and the first computing system is classified as one which contains one or more flaws, flag the first computing system for investigation by a manufacturer of the first computing system.

7. The analysis server of claim 6, wherein the instructions are to cause the processor to:
    when the resource of the first computing system is not saturated and the first computing system is classified as one which does not contain one or more flaws, provide no recommendation.

8. A non-transitory machine-readable storage medium comprising instructions that, when executed by a processor of an analysis server, cause the processor to:
    determine, using an expected resource utilization model, an expected utilization of a resource of the first computing system based on workload description parameter values and hardware description parameter values regarding the first computing system;
    receive a measurement of an actual utilization of the resource of the first computing system; and
    classify, using a flaw classifier model, the first computing system as one which contains or does not contain one or more flaws that affect a performance of the first computing system, the classification based on the expected utilization of the resource and the actual utilization of the resource;

when the resource of the first computing system is saturated, determine which of multiple different recommendations to provide depending on whether the first computing system is classified as one which contains one or more flaws; and when the resource of the first computing system is not saturated, determine whether to flag the first computing system depending on whether the first computing system is classified as one which contains one or more flaws.

9. The non-transitory machine-readable storage medium of claim 8, wherein the workload description parameter values and the actual utilization of the resource are measured during one or more time periods in which the resource of the first computing system experiences saturation.

10. The non-transitory machine-readable storage medium of claim 8, the instructions to cause the processor to:

when the resource of the first computing system is saturated and the first computing system is classified as one which does not contain one or more flaws, recommend one or more of a hardware upgrade and a workload attenuation to an operator of the first computing system.

11. The non-transitory machine-readable storage medium of claim 8, the instructions to cause the processor to:

when the resource of the first computing system is saturated and the first computing system is classified as one which contains one or more flaws, recommend the operator of the first computer system to contact customer support to receive remediation steps.

12. The non-transitory machine-readable storage medium of claim 8, the instructions to cause the processor to:

when the resource of the first computing system is not saturated and the first computing system is classified as one which contains one or more flaws, flag the first computing system for investigation by a manufacturer of the first computing system.

13. The non-transitory machine-readable storage medium of claim 8, the instructions to cause the processor to:

when the resource of the first computing system is not saturated and the first computing system is classified as one which does not contain one or more flaws, provide no recommendation.

14. A method comprising:

determining, using an expected resource utilization model, an expected utilization of a resource of a first computing system based on workload description parameter values and hardware description parameter values regarding the first computing system;

receiving a measurement of an actual utilization of the resource of the first computing system;

classifying, using a flaw classifier model, the first computing system as one which contains or does not contain one or more flaws that affect a performance of the first computing system, the classification based on the expected utilization of the resource and the actual utilization of the resource;

determining whether to provide one or more of a plurality of different recommendations or to flag the first computing system, based on whether the resource of the first computing system is saturated and whether the first computing system is classified as one which contains one or more flaws; and based on classifying the first computing system as one which contains one or more flaws that affect the performance of the first computing system and determining that the resource of the first computing system is saturated, displaying a user interface with (i) one or more suggested remediation measures to address the one or more flaws, and (ii) one or more user interface elements which, when selected by a user, cause activities associated with the one or more remediation measures to be performed.

15. The method of claim 14, wherein saturation of the resource exists when the actual utilization has reached or exceeded a level over which a degradation in the performance of the first computing system is present.

16. The method of claim 14, wherein the classification is further based on information regarding how the resource is being used, the information including one or more of proportions of the utilization of the resource by sub-modules of an operating system of the first computing system, or state variables of the first computing system.

17. The method of claim 14, comprising:

when a resource of a second computing system is saturated and is classified as one which does not contain one or more flaws, recommending one or more of a hardware upgrade and a workload attenuation to an operator of the second computing system; and wherein one of the one or more user interface elements, when selected by a user, is to cause opening of a support case to address the performance of the first computing system.

18. The method of claim 14, wherein the activities associated with the one or more remediation measures include at least one of upgrading a software of the first computing system, upgrading a firmware of the first computing system, modifying a volume configuration of the first computing system, modifying an operating system configuration of the first computing system, moving contents of a volume from a first resource pool of the first computing system to a second resource pool of the first computing system, modifying a data protection schedule of the first computing system, opening a support ticket for the first computing system, or opening a sales engagement to purchase additional hardware for the first computing system.

19. The method of claim 14, comprising:

when a resource of a second computing system is not saturated and the second computing system is classified as one which contains one or more flaws, flagging the second computing system for investigation by a manufacturer of the second computing system.

* * * * *